(12) United States Patent
Berg et al.

(10) Patent No.: US 12,310,275 B2
(45) Date of Patent: May 27, 2025

(54) METHODS AND SYSTEMS FOR MODELING SOIL PROCESSES AND PROPERTIES

(71) Applicant: ADVANCED AGRILYTICS HOLDINGS, LLC, Indianapolis, IN (US)

(72) Inventors: William Kess Berg, Clayton, IN (US); Jon J. Fridgen, Lancaster, KY (US)

(73) Assignee: ADVANCED AGRILYTICS HOLDINGS, LLC, Indianapolis, IN (US)

( * ) Notice: Subject to any disclaimer, the term of this patent is extended or adjusted under 35 U.S.C. 154(b) by 0 days.

(21) Appl. No.: 17/850,988

(22) Filed: Jun. 27, 2022

(65) Prior Publication Data

US 2022/0369535 A1    Nov. 24, 2022

Related U.S. Application Data

(63) Continuation of application No. 17/327,055, filed on May 21, 2021, now Pat. No. 11,369,055.

(51) Int. Cl.
| | |
|---|---|
| *A01B 79/00* | (2006.01) |
| *G06T 17/05* | (2011.01) |
| *G06V 20/10* | (2022.01) |

(52) U.S. Cl.
CPC ............ *A01B 79/005* (2013.01); *G06T 17/05* (2013.01); *G06V 20/188* (2022.01)

(58) Field of Classification Search
CPC ..... A01B 79/005; G06V 20/188; G06T 17/05

(Continued)

(56) References Cited

U.S. PATENT DOCUMENTS

| 10,878,967 B1 | 12/2020 | Berg et al. |
| 2017/0105335 A1 | 4/2017 | Xu et al. |

(Continued)

FOREIGN PATENT DOCUMENTS

| WO | WO-2016/127094 A1 | 8/2016 |
| WO | WO-2019/032648 A1 | 2/2019 |

OTHER PUBLICATIONS

International Application No. PCT/US2022/030031, International Search Report and Written Opinion, mailed Sep. 9, 2022.

(Continued)

*Primary Examiner* — Mahmoud S Ismail
(74) *Attorney, Agent, or Firm* — MARSHALL, GERSTEIN & BORUN LLP; Randall G. Rueth

(57) ABSTRACT

A method includes receiving a machine data set; determining a respective soil strength measurement; processing the respective soil strength measurement to generate a recommendation including an executable agricultural prescription; and storing the executable agricultural prescription. A computing system includes a processor and a memory storing instructions that, when executed by the one or more processors, cause the computing system to: receive a machine data set; determine a respective soil strength measurement; process the respective soil strength measurement to generate a recommendation including an executable agricultural prescription; and store the executable agricultural prescription. A non-transitory computer readable medium includes program instructions that when executed, cause a computer to receive a machine data set; determine a respective soil strength measurement; process the respective soil strength measurement to generate a recommendation including an executable agricultural prescription; and store the executable agricultural prescription.

20 Claims, 22 Drawing Sheets

(58) Field of Classification Search
USPC .......................................................... 701/50
See application file for complete search history.

(56) References Cited

U.S. PATENT DOCUMENTS

| | | | |
|---|---|---|---|
| 2017/0365064 A1 | 12/2017 | van 'T Woud et al. | |
| 2018/0108123 A1* | 4/2018 | Baurer | G06F 16/587 |
| 2018/0292339 A1 | 10/2018 | Gunzenhauser | |
| 2019/0357425 A1 | 11/2019 | Dharna et al. | |
| 2020/0077574 A1 | 3/2020 | Bull et al. | |
| 2020/0084953 A1 | 3/2020 | Stanhope et al. | |
| 2020/0154626 A1 | 5/2020 | Schoeny | |
| 2020/0160459 A1 | 5/2020 | Coolidge et al. | |
| 2021/0112705 A1 | 4/2021 | Coolidge et al. | |
| 2021/0136994 A1* | 5/2021 | van Haaren | A01B 79/005 |
| 2021/0224927 A1* | 7/2021 | Perry | G06F 18/217 |
| 2022/0051118 A1* | 2/2022 | Rooney | G06Q 30/0205 |
| 2022/0240432 A1* | 8/2022 | Acedo | A01C 21/002 |
| 2022/0256834 A1* | 8/2022 | Lopes Agnese | A01M 21/04 |
| 2022/0295691 A1* | 9/2022 | Barhai | A01C 21/007 |

OTHER PUBLICATIONS

Harrigan et al., Draft Relationships for Tillage and Seed Equipment, Applied Engineering in Agriculture, 11(6):773-83 (1995).

* cited by examiner

METHODS AND SYSTEMS FOR MODELING SOIL PROCESSES AND PROPERTIES

CROSS-REFERENCE TO RELATED APPLICATIONS

This application is a continuation of U.S. patent application Ser. No. 17/327,055, entitled METHODS AND SYSTEMS FOR MODELING SOIL PROCESSES AND PROPERTIES, filed on May 21, 2021, which is hereby incorporated by reference in its entirety.

TECHNICAL FIELD

The present disclosure is generally directed to methods and systems for modeling soil processes and properties, and more specifically, for generating field management recommendations based on one or more determined clay types within a field and/or sub-field.

BACKGROUND

Understanding soil physical properties is essential to understanding other processes in agricultural fields affecting yield. Existing data sources such as Soil Survey Geographic Database (SSURGO) do not provide growers, agronomists and other interested parties with sufficient spatial resolution. Quantifying soil physical properties is conventionally time-consuming and labor-intensive. For example, conventional determinations of basic soil properties (e.g., respective sand, silt and clay fractional parts) requires extensive sampling and processing.

In the case of sand/silt/clay fractional analysis, one must collect, dry, grind, subsample soil. The soil must be placed in, for example, a one-liter beaker. Water must be added to the beaker, along with dispersant. The beaker must be agitated to suspend the soil particles, and one must use a hydrometer to measure density at different points in time. For example, to determine a sand fractional content, the hydrometer must be immediately measured after agitation. Silt may then be measured, but not until a period of time (e.g., 15 minutes) has passed. Clay may then be measured, but only after one hour. Thus, in sum, the process of fractional measurement may take anywhere from one to two hours, including preparation time, for a single soil sample. Doing such work for multiple field samples requires extensive human manual power and time. More complex soil analyses may require still further time and energy.

Furthermore, conventional approaches to describing soil physical properties are lacking adequate visualization techniques. Growers, agronomists, and field managers are not able, at present, to understand the relationship between field conditions and equipment responses. Furthermore, quantification of field sustainability is generally poor. Thus, improved techniques for determining soil physical properties are needed.

BRIEF SUMMARY

In one aspect, a computer-implemented method of improving and quantifying sustainable growing practices within an agricultural field includes (i) receiving, via one or more processors, a machine data set corresponding to a plurality of growing medium data points within the agricultural field; (ii) determining, for each of a plurality of hexagrids corresponding to the agricultural field, a respective soil strength measurement; (iii) processing the respective soil strength measurement of at least one of the plurality of hexagrids using a trained machine learning model to generate a recommendation including an executable agricultural prescription configured to be executed by an agricultural implement to modify a state of the agricultural field; and (iv) storing the executable agricultural prescription in a non-transitory memory.

In another aspect, a computing system includes one or more processors; and one or more memories having stored thereon instructions that, when executed by the one or more processors, cause the computing system to: (i) receive, via one or more processors, a machine data set corresponding to a plurality of growing medium data points within the agricultural field; (ii) determine, for each of a plurality of hexagrids corresponding to the agricultural field, a respective soil strength measurement; (iii) process the respective soil strength measurement of at least one of the plurality of hexagrids using a trained machine learning model to generate a recommendation including an executable agricultural prescription configured to be executed by an agricultural implement to modify a state of the agricultural field; and (iv) store the executable agricultural prescription in the one or more memories.

A non-transitory computer readable medium includes program instructions that when executed, cause a computer to: (i) receive, via one or more processors, a machine data set corresponding to a plurality of growing medium data points within an agricultural field; (ii) determine, for each of a plurality of hexagrids corresponding to the agricultural field, a respective soil strength measurement; (iii) process the respective soil strength measurement of at least one of the plurality of hexagrids using a trained machine learning model to generate a recommendation including an executable agricultural prescription configured to be executed by an agricultural implement to modify a state of the agricultural field; and (iv) store the executable agricultural prescription in the one or more memories.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict preferred embodiments for purposes of illustration only. One of ordinary skill in the art will readily recognize from the following discussion that alternative embodiments of the systems and methods illustrated herein may be employed without departing from the principles of the invention described herein.

DETAILED DESCRIPTION

Overview

The present disclosure is generally directed to methods and systems for modeling soil processes and properties, and more specifically, for collecting and analyzing machine data to infer soil properties from machine data to quantify the field, and to better maximize field productivity and sustainability.

The present techniques enable growers, trusted advisors and field managers to predict soil physical properties by analyzing machine data. Machine data may include machine performance during tillage operations, planting, crop protection applications and/or at harvest time. The present techniques further provide advantageous visualization tools to assist growers to understand the drivers of increased draft, to quantify sustainability, to understand attributes contributing to engine load to generate soil health and soil strength metrics, and to infer attributes such as soil strength, soil change rate and aggregate stability for field characterization purposes.

The present techniques include methods and systems for collecting machine data and for translating engine torque into various attributes (e.g., drawbar pulling force and soil strength). The present techniques may include analyzing input data layers to determine field attributes. The present techniques aid in sustainable growing practices, for example, by determining when and where soil health is maximized, relative to soil strength. Herein, the term "growing medium" is understood to include any suitable growth media such as soil, compost, garden soil, potting soil, hydroponic media, etc.

In some embodiments, map layers may be encoded in spatial data files encoded in a suitable file format, such as a commercial or open source shapefile, a GeoJSON format, a Geography Markup Language (GML) file, etc. Such spatial data files may include one or more layers (i.e., map layers, wherein each layer represents an agricultural characteristic (e.g., elevation, clay type, soil property, etc.). The map layers may be generated based on agricultural machine data collected or obtained as described below. The individual layer(s) and/or files may be shared between multiple computing devices of an agricultural company, provided or sold to customers, stored in a database, etc.

Exemplary Computing Environment

Figure 1:
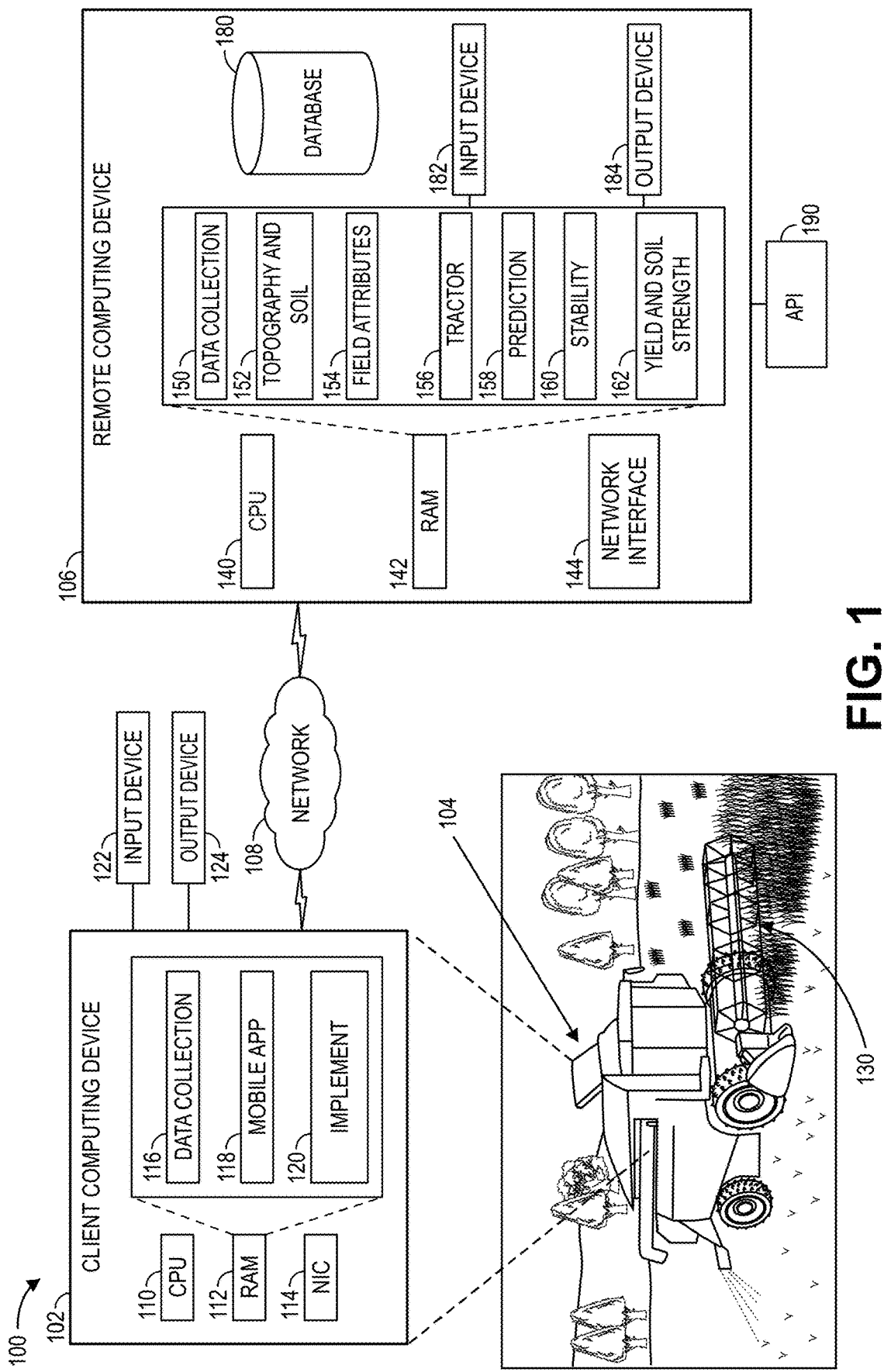
FIG. 1 depicts an exemplary computing environment, according to an embodiment.

FIG. 1 depicts an exemplary computing environment 100 in which the techniques disclosed herein may be implemented, according to an embodiment.

The environment 100 includes a client computing device 102, an implement 104, a remote computing device 106, and a network 108. Some embodiments may include a plurality of client computing devices.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some embodiments the client computing device 102 may be a personal portable device of a user. In some embodiments the client computing device 102 may be temporarily or permanently affixed to the implement 104. For example, the client computing device 102 may be the property of a customer, an agricultural analytics (or "agrilytics") company, an implement manufacturer, etc.

The client computing device 102 includes a processor 110, a memory 112 and a network interface controller (NIC) 114. The processor 110 may include any suitable number of processors and/or processor types, such as CPUs, one or more graphics processing units (GPUs), etc. Generally, the processor 110 is configured to execute software instructions stored in a memory 112. The memory 112 may include one or more persistent memories (e.g., a hard drive/solid state memory) and stores one or more set of computer executable instructions/modules, including a data collection module 116, a mobile application module 118, and an implement control module 120, as described in more detail below. More or fewer modules may be included in some embodiments. The NIC 114 may include any suitable network interface controller(s), such as wired/wireless controllers (e.g., Ethernet controllers), and facilitate bidirectional/multiplexed networking over the network 108 between the client computing device 102 and other components of the environment 100 (e.g., another client computing device 102, the implement 104, the remote computing device 106, etc.).

The one or more modules stored in the memory 112 may include respective sets of computer-executable instructions implementing specific functionality. For example, in an embodiment, the data collection module 116 includes a set of computer-executable instructions for collecting a machine data set from an implement (e.g., the implement 104). The data collection module 116 may include instructions for collecting an above-ground and/or below-ground soil sample.

The machine data collection module 116 may include a respective set of instructions for retrieving/receiving data from a plurality of different implements. For example, a first set of instructions may be for retrieving/receiving machine data from a first tractor manufacturer, while a second set of instructions is for retrieving/receiving machine data from a second tractor manufacturer. In another embodiment, the first and second set of instructions may be for, respectively, receiving/retrieving data from a tiller and a harvester. Of course, some libraries of instructions may be provided by the manufacturers of various implements and/or attachments, and may be loaded into the memory 112 and used by the data collection module 116.

The data collection module 116 may retrieve/receive machine data from a separate hardware device (e.g., a client computing device 102 that is part of the implement 104) or directly from one or more of the sensors of the implement 104 and/or one or more of the attachments 130 coupled to the implement 104, if any. Specifically, in some embodiments, the machine data collection module 116 may include instructions for collecting machine data from a one or more specialized devices that integrate with the implement 104 (e.g., one or more Farmobile PUC™ devices). In some embodiments, the one or more specialized devices may correspond to the client computing device 102, and may transfer data to a cloud-based server for later retrieval via the network 108, and/or to the remote computing device 106. Such specialized devices may be used to acquire machine data during primary tillage operations (e.g., while a CaseIH 875 is tilling a field).

Figure 7:
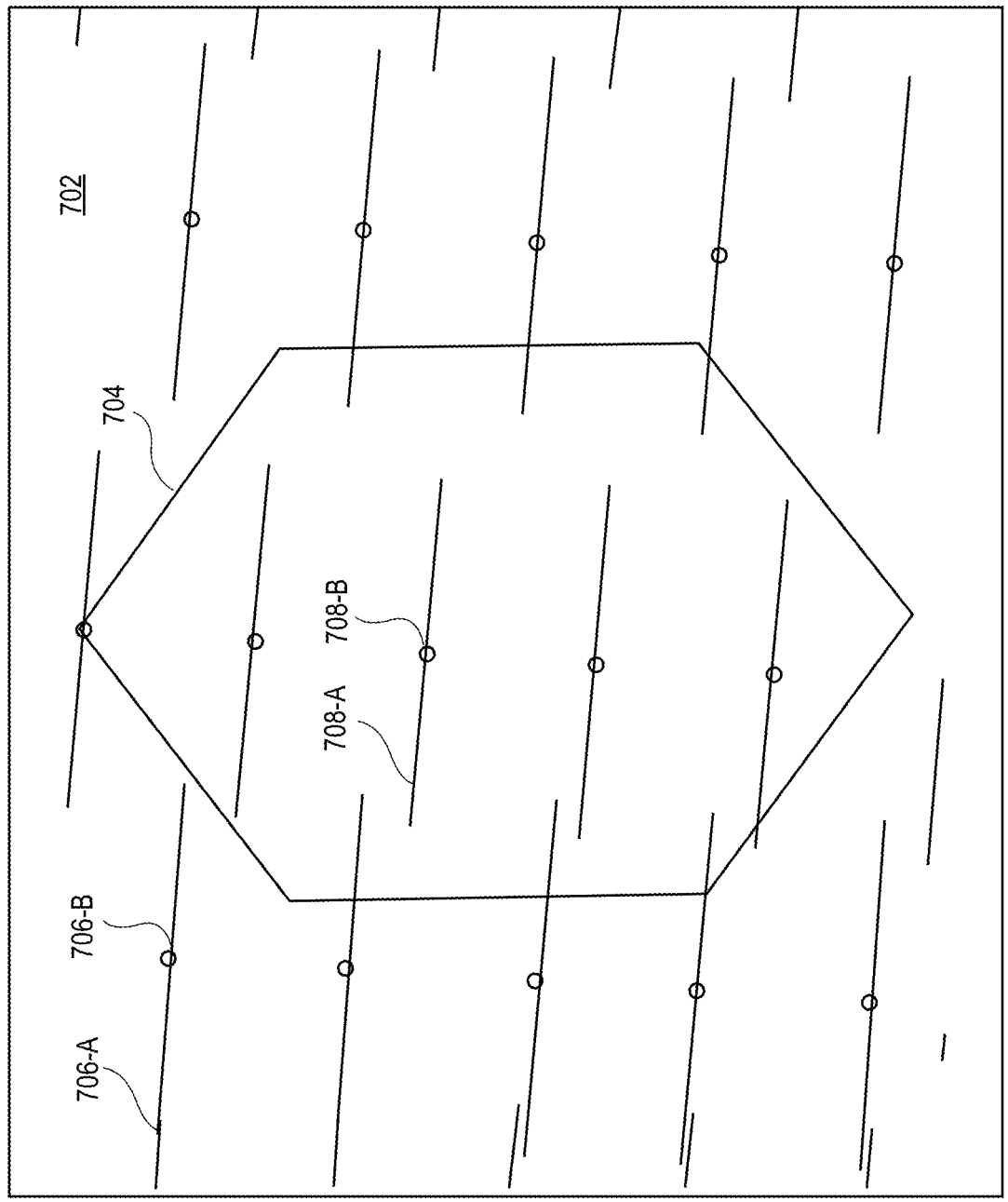
FIG. 7 depicts an exemplary growing environment including a field and a hexagrid cell, according to one embodiment.

The machine data may include any information generated by the client computing device 102, the implement 104 and/or the attachments 130. In some cases, the machine data may be retrieved/received via the remote computing device 106 (e.g., from a third-party cloud storage platform). Cloud machine data may be retrieved, cleaned and correlated to other machine data. For example, the machine data may include a plurality of observations including a Global Positioning Satellite (GPS) heading. The GPS heading of the observations may be matched to a respective GPS heading of the implement 104. In some embodiments, the GPS of the data from the specialized device may be matched to GPS data of the tractor to generate one or more line features, as depicted in FIG. 7, below. The machine data may include sensor measurements of engine load data, fuel burn data, draft, fuel consumption, wheel slippage, etc. The machine data may include one or more time series, such that one or more measured values are represented in a single data set at a common interval (e.g., one-second). For example, the machine data may include a first time series of draft at a one-second interval, a second time series of wheel slippage, etc.

The machine data may include location information. For example, the client computing device 102 may add location metadata to the machine data, such that the machine data reflects an absolute and/or relative geographic position (i.e., location, coordinate, offset, heading, etc.) of the client computing device 102, the implement 104, and/or the attachments 130 within the agricultural field at the precise moment that the client computing device 102 captures the machine data. It will also be appreciated by those of ordinary skill in the art that some sensors and/or agricultural equipment may generate machine data that is received by the client computing device 102 that already includes location metadata added by the sensors and/or agricultural equipment. In an embodiment wherein the machine data comprises a time series, each value of the time series may include a respective geographic metadata entry. It will be further appreciate by those of ordinary skill in the art that when the machine data is received from a historical archive, the machine data may include historical location data (e.g., the GPS coordinates corresponding to the location from which the historical machine data was captured).

The data collection module 116 may receive and/or retrieve the machine data via an API through a direct hardware interface (e.g., via one or more wires) and/or via a network interface (e.g., via the network 108). The data collection module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some embodiments (e.g., once every 10 milliseconds). The data collection module 116 may include instructions for modifying and/or storing the machine data. For example, the data collection module 116 may parse the raw machine data into a data structure. The data collection module 116 may write the raw machine data onto a disk (e.g., a hard drive in the memory 112).

In some embodiments, the data collection module 116 may transfer the raw machine data, or modified machine data, to a remote computing system/device, such as the remote computing device 106. The transfer may, in some embodiments, take the form of an SQL insert command. In effect, the data collection module 116 performs the function of receiving, processing, storing, and/or transmitting the machine data. The data collection module 116 may receive (e.g., from a soil probe attachment) soil sample data corresponding to one or more points within the machine data.

The mobile application module 118 may include computer-executable instructions that display one or more graphical user interfaces (GUIs) on the output device 124 and/or receive user input via the input device 122. For example, the mobile application module 118 may correspond to a mobile computing application (e.g., an Android, iPhone, or other) computing application of an agrilytics company. The mobile computing application may be a specialized application corresponding to the type of computing device embodied by the client computing device 102. For example, in embodiments where the client computing device 102 is a mobile phone, the mobile application module 118 may correspond to a mobile application downloaded for iPhone. When the client computing device 102 is a tablet, the mobile application module 118 may correspond to an application with tablet-specific features. Exemplary GUIs that may be displayed by the mobile application module 118, and with which the user may interact, are discussed below.

The mobile application module 118 may include instructions for receiving/retrieving mobile application data from the remote computing device 106. In particular, the mobile application module 118 may include instructions for transmitting user-provided login credentials, receiving an indication of successful/unsuccessful authentication, and other functions related to the user's operation of the mobile application. The mobile application module 118 may include instructions for receiving/retrieving, rendering, and displaying visual maps in a GUI. Specifically, the application module 118 may include computer-executable instructions for displaying one or more map layers in the output device 124 of the client computing device 102. The map layers may depict, for example, one or more attributes of an agricultural field.

The implement control module 120 includes computer-executable instructions for controlling the operation of an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102, causes the implement 104 to change operating depth or operating mode, or collect a soil sample using a soil probe.

In some embodiments, the implement control module 120 may cause one of the attachments 130 to change the operating angle on the disc arm of a tiller, or to apply more or less downward or upward pressure on the ground. In some embodiments, the implement control module 120 may control the attachments 130 in response to aspects of the agricultural field where the implement 130 is positioned. Practically, the implement control module 120 has at least as much control of the implement 104 and/or attachments 130 as does the human operator.

The implement control module 120 may include a respective set of instructions for controlling a plurality of implements. For example, a first set of instructions may be for controlling an implement of a first tractor manufacturer, while a second set of instructions is for controlling an implement of a second tractor manufacturer. In another embodiment, the first and second set of instructions may be for, respectively, controlling a tiller, planter or harvester. Of course, many configurations and uses are envisioned beyond those provided by way of example.

In some embodiments, the implement control module 120 may include computer-executable instructions for executing one or more agricultural prescriptions with respect to a field. For example, the control module 120 may execute an agricultural prescription that specifies, for a given agricultural field, a varying application rate of a chemical (e.g., a fertilizer, an herbicide, a pesticide, etc.) or a seed to apply at various points along the path based on the clay characteristics of the field. The control module 120 may analyze the current location of the implement 104 and/or the attachments 130 in real-time (i.e., as the control module 120 executes the agricultural prescription).

In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 108 with the implement 104 and/or an attachments 130 that may be coupled to the implement 104. The implement 104 and/or the attachments 130 may be configured for bidirectional communication with the client computing device 102 via the network 108.

The client computing device 102 may receive/retrieve data (e.g., machine data) from the implement 104, and/or the client computing device 102 may transmit data (e.g., instructions) to the implement 104. The client computing device 102 may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a tractor, a combine, a cultivator, a cultipacker, a plow, a harrow, a stripper, a tiller, a planter, a baler, a sprayer, an irrigator, a sorter, an harvester, etc. The implement 104 may include one or more sensors (not depicted) including one or more soil probe and the implement 104 may be coupled to one or more attachments 130. For example, the implement 104 may include one or more sensors for measuring respective implement values of engine load data, fuel burn data, draft sensing, fuel consumption, wheel slippage, etc. Many embodiments including more or fewer sensors measuring more or fewer implement values are envisioned. The implement 104 may be a gas/diesel, electric, or hybrid vehicle operated by a human operator and/or autonomously (e.g., as an autonomous/driverless agricultural vehicle).

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., a tiller). The attachments 130 may include one or more sensors (not depicted) that may differ in number and/or type according to the respective type of the attachments 130 and the particular embodiment/scenario. For example, a planter attachment 120 may include one or more soil coring or sensing probes. It should be appreciated that many attachments 130 sensor configurations are envisioned. For example, the attachments 130 may include one or more cameras. The attachments 130 may be connected to the implement 104 via wires or wirelessly, for both control and communications. For example, attachments 130 may be coupled to the client computing device 102 of the implement 104 via a wired and/or wireless interface for data transmission (e.g., IEEE 802.11, WiFi, etc.) and main/auxiliary control (e.g., 7-pin, 4-pin, etc.). The client computing device 102 may communicate bidirectionally (i.e., transmit data to, and/or receive data from) with the remote computing device 106 via the network 108.

The client computing device 102 includes an input device 122 and an output device 124. The input device 122 may include any suitable device or devices for receiving input, such as one or more microphone, one or more camera, a hardware keyboard, a hardware mouse, a capacitive touch screen, etc. The output device 124 may include any suitable device for conveying output, such as a hardware speaker, a computer monitor, a touch screen, etc. In some cases, the input device 122 and the output device 124 may be integrated into a single device, such as a touch screen device that accepts user input and displays output. The client computing device 102 may be associated with (e.g., leased, owned, and/or operated by) an agrilytics company.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the remote computing device 106, or between multiple client computing devices 102, for example.

The remote computing device 106 includes a processor 140, a memory 142, and a NIC 144. The processor 140 may include any suitable number of processors and/or processor types, such as CPUs and one or more graphics processing units (GPUs). Generally, the processor 140 is configured to execute software instructions stored in the memory 142. The memory 142 may include one or more persistent memories (e.g., a hard drive/solid state memory) and stores one or more set of computer executable instructions/modules, as discussed below. For example, the remote computing device 106 may include a data processing module 150, a topography and soil module 152, a field attributes module 154, a tractor module 156, a prediction module 158, a soil stability module 160, and a yield and soil strength module 162.

The NIC 144 may include any suitable network interface controller(s), such as wired/wireless controllers (e.g., Ethernet controllers), and facilitate bidirectional/multiplexed networking over the network 106 between the remote computing device 106 and other components of the environment 100 (e.g., another remote computing device 106, the client computing device 102, etc.).

The one or more modules stored in the memory 142 may include respective sets of computer-executable instructions implementing specific functionality. For example, in an embodiment, the data processing module 150 includes computer-executable instructions for receiving/retrieving data from the client computing device 102, the implement 104, and/or the attachments 130. For example, the data processing module 150 may include instructions that when executed by the processor 140, cause the remote computing device 106 to receive/retrieve machine data. The data processing module 150 may include further instructions for storing the machine data in one or more tables of the database 180. The data processing module 150 may store raw machine data, or processed data.

The data processing module 150 may include instructions for processing the raw machine data to generate processed data. For example, the processed data may be data that is represented using data types data of a programming language (e.g., R, C#, Python, JavaScript, etc.). The data processing module 150 may include instructions for validating the data types present in the processed data. For example, the data processing module 150 may verify that a value is present (i.e., not null) and is within a particular range or of a given size/structure. In some embodiments, the data processing module 150 may transmit processed data from the database 180 in response to a query, or request, from the client computing device 102. The data processing module 150 may transmit the processed data via HTTP or via another data transfer suitable protocol.

The topography and soil module 152 may include instructions for retrieving and/or providing mapping data (e.g., electronic map layer objects) to other modules in the remote computing device 106. The mapping data may take the form of raw data (e.g., a data set representing clay composition map for a spatial area). In some embodiments, the topography and soil module may include spatial data files. The topography and soil module 152 may store mapping data in, and retrieve mapping data from, the database 180. The topography and soil module 152 may source elevation data from public sources, such as the United States Geological Survey (USGS) National Elevation Dataset (NED) database.

In some embodiments, the data processing module 150 may provide raw data to the topography and soil module 152, wherein instructions within the topography and soil module 152 infer the elevation of a particular tract of land by analyzing the raw data. The elevation data may be stored in a two-dimensional (2D) or three-dimensional (3D) data format, depending on the embodiment and scenario. The topography and soil module 152 may generate information regarding soil properties, and store that generated data in association with one or more fields. For example, in some embodiments, the topography and soil module 152 may analyze Light Detection and Ranging (Lidar) elevation data from secondary data sources, to generate soil property information (e.g., wetness index information).

The field attributes module 154 may analyze machine data from soil samples to determine one or more field attributes, such as organic matter, cation exchange capability, etc. The field attributes module 154 may measure bulk density, in some embodiments. The field attributes module 154 may be used to separate soil data according to soil type/series or other attributes, in some embodiments, and to depict bulk density variability using map layers that may be of the same spatial profile or shape as those depicted in FIGS. 3-4C.

The tractor module 156 may include instructions for aligning observation data and hexagrid cells. The tractor module 156 may access GPS data included in machine data, to determine the position of the implement 104 at the time when the observations were recorded. The tractor module 156 may include instructions for accessing specialized devices (e.g., a Farmobile PUC). The tractor module 156 may include instructions for aligning one or more the hexagrid cell line features, wherein the line features are based on a known attribute of a tractor (e.g., implement width). The tractor module 156 may match the GPS heading of the tractor with each of the observations to process the observations into line features. That is, the line features 706-A and 708-A may not be present in the original machine data received by the remote computing device 106. In some embodiments, the tractor module 156 may access one or more parameters in a device (e.g., the Farmobile PUC device) to predict soil physical properties.

In some embodiments, the tractor module 156 may include instructions for accessing tractor data via the database 180. For example, the tractor module 156 may access one or more attributes of a tractor, such as horsepower, torque, drawbar pull, etc. Such information may be obtained from a public information sources (e.g., from the University of Nebraska Tractor Testing Lab) and stored in the database 180 in advance of the operation of the computing environment 100, or on demand.

The prediction module 158 may include instructions for analyzing data determined by the field attributes module 154 and the tractor module 156, inter alia, to generate one or more prediction. For example, the prediction module 158 may analyze an intersection of one or more line feature with the hexagrid to predict fuel usage and engine torque in the hexagrid. The prediction module 158 may determine the amount of work expended by the engine of the implement 104, by computing a direct representation of drawbar load as the implement 104 traverses the field, or with respect to historical machine data. The prediction module 158 may include instructions for generating plots of predicted attributes (e.g., drawbar load). The prediction module 158 may include instructions for computing a relationship between torque and drawbar pull for one or more specific tractor models. The prediction module 158 may access information relating to various tractor modules via the tractor module 156.

In general, the prediction module 158 may include a machine learning module (not depicted) that includes instructions for training and/or operating one or more machine learning (ML) models. In supervised learning embodiments, training may include training an artificial neural network (ANN). This training may include establishing a network architecture, or topology, adding layers including activation functions for each layer (e.g., a "leaky" rectified linear unit (ReLU), softmax, hyperbolic tangent, etc.), loss function, and optimizer. In an embodiment, the ANN may use different activation functions at each layer, or as between hidden layers and the output layer. A suitable optimizer may include Adam and Nadam optimizers.

In an embodiment, a different neural network type may be chosen (e.g., a recurrent neural network, a deep learning neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the ANN may be encoded in an N-dimensional tensor, array, matrix, and/or other suitable data structure. In some embodiments, training may be performed by successive evaluation (e.g., looping) of the network, using training labeled training samples. The process of training the ANN may cause weights, or parameters, of the ANN to be created. The weights may be initialized to random values. The weights may be adjusted as the network is successively trained, by using one of several gradient descent algorithms, to reduce loss and to cause the values output by the network to converge to expected, or "learned", values. In an embodiment, a regression may be used which has no activation function. Therein, input data may be normalized by mean centering, and a mean squared error loss function may be used, in addition to mean absolute error, to determine the appropriate loss as well as to quantify the accuracy of the outputs. The data used to train the ANN may include image data. In some embodiments, multiple ANNs may be separately trained and/or operated (e.g., by using a separate ML operation module in the memory 142).

In unsupervised learning embodiments, the machine learning module may include instructions for finding previously-unknown patterns. For example, the machine learning module may receive machine data. The machine learning module may analyze the machine data and predict (i.e., classify or cluster) a category to which the machine data belongs, based upon one or more features included within the machine data and a set of predefined categories. The features may differ, depending on the embodiment. For example, in one embodiment, the features may be a plurality of attributes, or properties, present in the machine data. The prediction of machine data may occur at a grid level (e.g., one overall and/or total prediction per 8.5 m hexagrid). For example, in some embodiments, the prediction module 158 may include instructions for computing partial-least-squares (PLS) analysis (e.g., to determine coefficients of attributes leading to increased draft).

The soil stability module 160 includes instructions for analyzing machine data to compute an aggregate stability metric. For example, the soil stability module 160 may analyze machine data belonging to a hexagrid and assign aggregate stability to the hexagrid.

The yield and soil strength module 162 may include instructions for analyzing soil strength. The instructions may include instructions for computing one or more probability density functions. The instructions may include instructions for generating plots of probability functions, and for analyzing expected yield.

In some embodiments, the yield and soil strength module 162 may include instructions for generating one or more sustainability measures with respect to a field, including a soil strength, a rate of soil change, or an aggregate stability. In some embodiments, the yield and soil strength module 162 may receive the sustainability measures from other modules (e.g., the soil stability module 160). The yield and soil strength module 162 may further include instructions for generating one or more recommendations based on the sustainability measures. In some embodiments, the yield and soil strength module 162 may generate the one or more recommendations using a rules-based system (e.g., an expert system) and/or a trained machine learning model. Training and operation of the machine learning model for generating sustainability recommendations may be performed consistent with the principles discussed above. For example, a machine learning module may train a machine learning model to maximize a yield function while also minimizing a sustainability function taking one of soil strength, rate of soil change or aggregate sustainability as parameters.

The yield and soil strength module 162 may include instructions for providing one or more recommendations to a user in an electronic format, such as via email, via a website, in an electronic document (e.g., a report), etc. In some embodiments, the remote computing device 106 may include instructions that cause the recommendation to be displayed in the output device 124 of the client computing device 102, for example. The content of the recommendation may include an executable prescription that may be executed by the implement 104, in some embodiments, to cause one or more physical changes to the agricultural field. In other embodiments, the executable prescription may instruct the implement (i.e., subsoiler) operate at different depths or incorporate differing amounts of crop residue.

The remote computing device 106 may further include one or more databases 180, an input device 182, an output device 184 and an application programming interface (API) 190.

The database 180 may be implemented as a relational database management system (RDBMS) in some embodiments. For example, the data store 180 may include one or more structured query language (SQL) databases, a NoSQL database, a flat file storage system, or any other suitable data storage system/configuration. In general, the database 180 allows the client computing device 102 and/or the remote computing device 106 to create, retrieve, update, and/or retrieve records relating to performance of the techniques herein. For example, the database 180 may allow the client computing device 102 to store information received from one or more sensors of the implement 104 and/or the attachments 130.

The database 180 may include a Lightweight Directory Access Protocol (LDAP) directory, in some embodiments. The client computing device 102 may include a module (not depicted) including a set of instructions for querying an RDBMS, an LDAP server, etc. For example, the client computing device 102 may include a set of database drivers for accessing the database 180 of the remote computing device 106. In some embodiments, the database 180 may be located remotely from the remote computing device 104, in which case the remote computing device 104 may access the database 180 via the NIC 112 and the network 106.

The input device 182 may include any suitable device or devices for receiving input, such as one or more microphones, one or more cameras, a hardware keyboard, a hardware mouse, a capacitive touch screen, etc. The input device 182 may allow a user (e.g., a system administrator) to enter commands and/or input into the remote computing device 106, and to view the result of any such commands/input in the output device 184. For example, an employee of the agrilytics company may use the input device 182 to adjust parameters with respect to one or more agricultural fields for applying macronutrients via a prescription.

The output device 184 may include any suitable device for conveying output, such as a hardware speaker, a computer monitor, a touch screen, etc. The remote computing device 106 may be associated with (e.g., leased, owned, and/or operated by) an agrilytics company. As noted above, the remote computing device 106 may be implemented using one or more virtualization and/or cloud computing services.

The application programming interface 190 may permit third-party access to one or more aspect of the computing environment 100. Specifically, one or more APIs may be accessible to third parties via the remote computing device 106.

In operation, the agrilytics company may access the remote computing device 106 to establish one or more field records on behalf of one or more growers. For example, the company may store the field records in the database, wherein each grower is associated with a unique identifier (e.g., a universally unique identifier (UUID)) as are each of the grower's respective fields. For example, the grower may be associated with the grower's fields in the database via a one-to-many relationship.

The agrilytics company may populate the database 180 with machine data corresponding to the grower's fields by using the implement 104 to drive the fields and collect the machine data. The machine data may include information gathered from an attachment 130 (e.g., a soil probe) and/or machine data collected from other sources. Once the machine data for the grower's fields has been collected, the data collection module 150, topography and soil module 152, and field attributes module 154 may analyze the machine data to determine soil properties corresponding to the grower's one or more fields.

As noted, the present techniques may include analyzing properties of soil samples using a soil probe implement. For example, in an embodiment, the implement 104 may include a probe attachment 130 that samples the soil of the field at different points. The sampling may include generating a dataset corresponding to the field, divided into hexagonal regions (e.g., a set of one or more hexagrids). The sampling may include analyzing one or more samples within each hexagrid to determine the absorptive properties (e.g., exchange free energy) of each sample. By computing such properties, the present techniques may be used to determine an appropriate treatment regime and/or to compare each sample to other measured soils. In some embodiments, samples may be collected at the same locations used in prior sampling periods (e.g., in prior days, weeks, months, years). For example, two two-inch cores may be sampled per location and returned to a research facility for processing, or processed onboard an implement such as the implement 104.

In some embodiments, a prescription module (not depicted) may include instructions for performing one or more treatments affecting portions of the field. For example, the prescription module may be pre-programmed to increase the potassium content of each hexagrid to a specified critical level. When the organic matter percentage of a given hexagrid is below the threshold, the prescription module may include instructions for applying additional nitrogen fertilizer to the hexagrid. The instructions for adding organic fertilizer may vary based on soil properties determined by the present techniques. For example, in a hexagrid having a higher cation exchange potential, the prescription module may cause less fertilizer to be applied to increase the potassium level, as compared to another hexagrid having a lower cation exchange potential. It should be appreciated that the examples provided are intentionally simplified for explanation, and many further embodiments are envisioned, as described below.

Exemplary Soil Data Sampling Environment Embodiments

Figure 2:
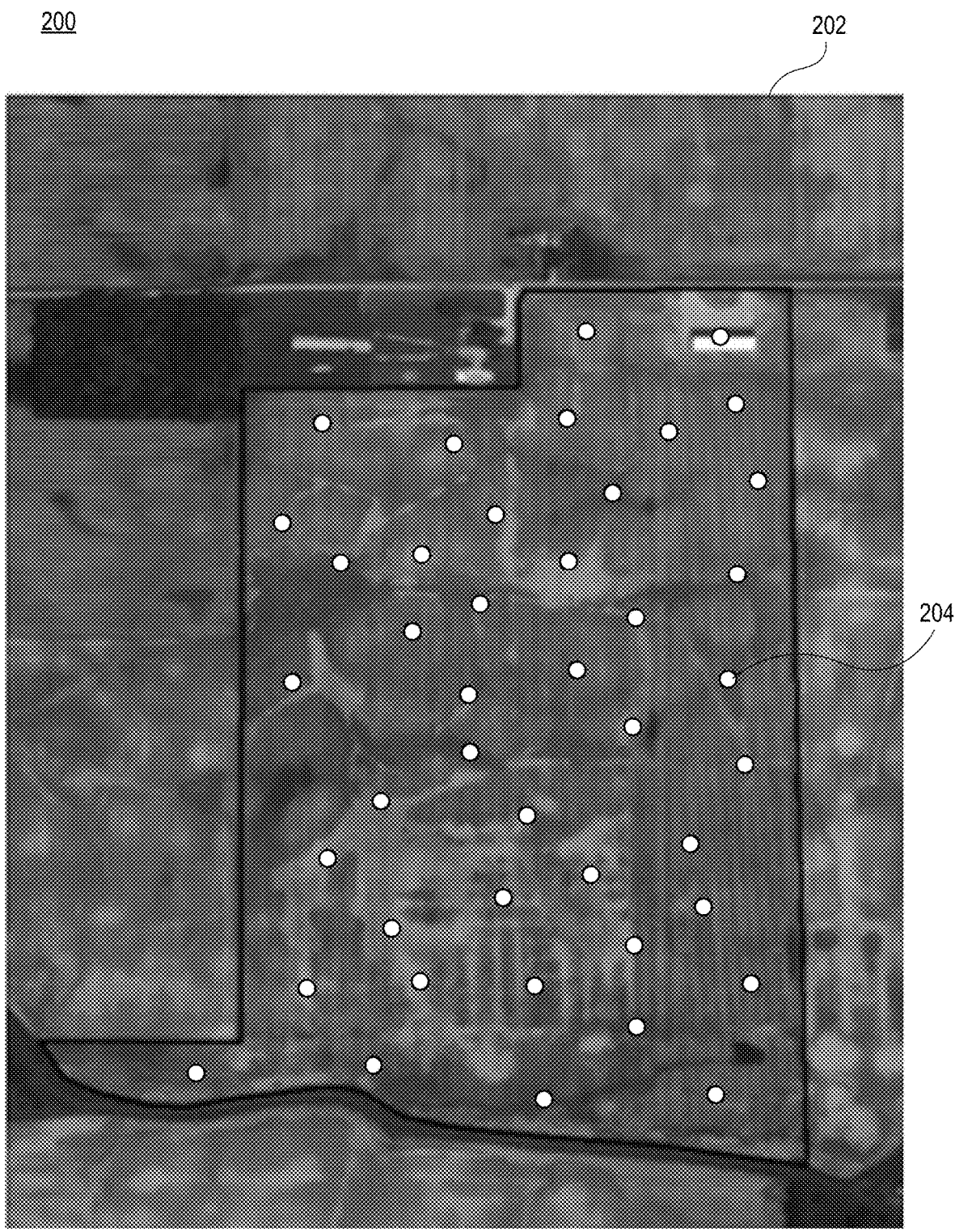
FIG. 2 depicts an exemplary soil data sampling environment, according to an embodiment.

FIG. 2 depicts an exemplary soil data sampling environment 200 depicting a plurality of agricultural fields 202, according to an embodiment. The agricultural fields may be part of a grower concern, and may be managed by the agrilytics company, for example. One of the fields in the plurality of the agricultural fields 202 may include a plurality of soil data sample points 204. In some embodiments, the agrilytics company may collect a one or more soil samples from each of the soil data sample points 204. For example, the agrilytics company may use the implement 104 to collect the plurality of soil data sample points 204. Each soil data sample point 204 in the soil data sampling environment may correspond to a hexagrid, as depicted in FIG. 7, below.

The soil sample points 204 may include soil attributes may be processed (e.g., by the data collection module 150) to generate one or more map layers including, but not limited to, organic matter (OM), cation-exchange capability (CEC), relative elevation, etc. The soil sample points 204 may be analyzed using a soil interpolation algorithm that takes the disparate soil sample points 204 and computes hexagrid maps including continuous values, as shown in the following figures. For example, in an embodiment, a soil sampling of the fields 202 may include an elevation change (e.g., nine feet or less) and a soil series (e.g., Pewarno and Blount), whereas Pewarno soil is a fine, mixed, superactive, mesic Typic Endoaquolls (Mollisol) soil and Blount is a fine illitic, mesic Aeric Epiaqualfs (Alfisol) Soil.

Figure 3:
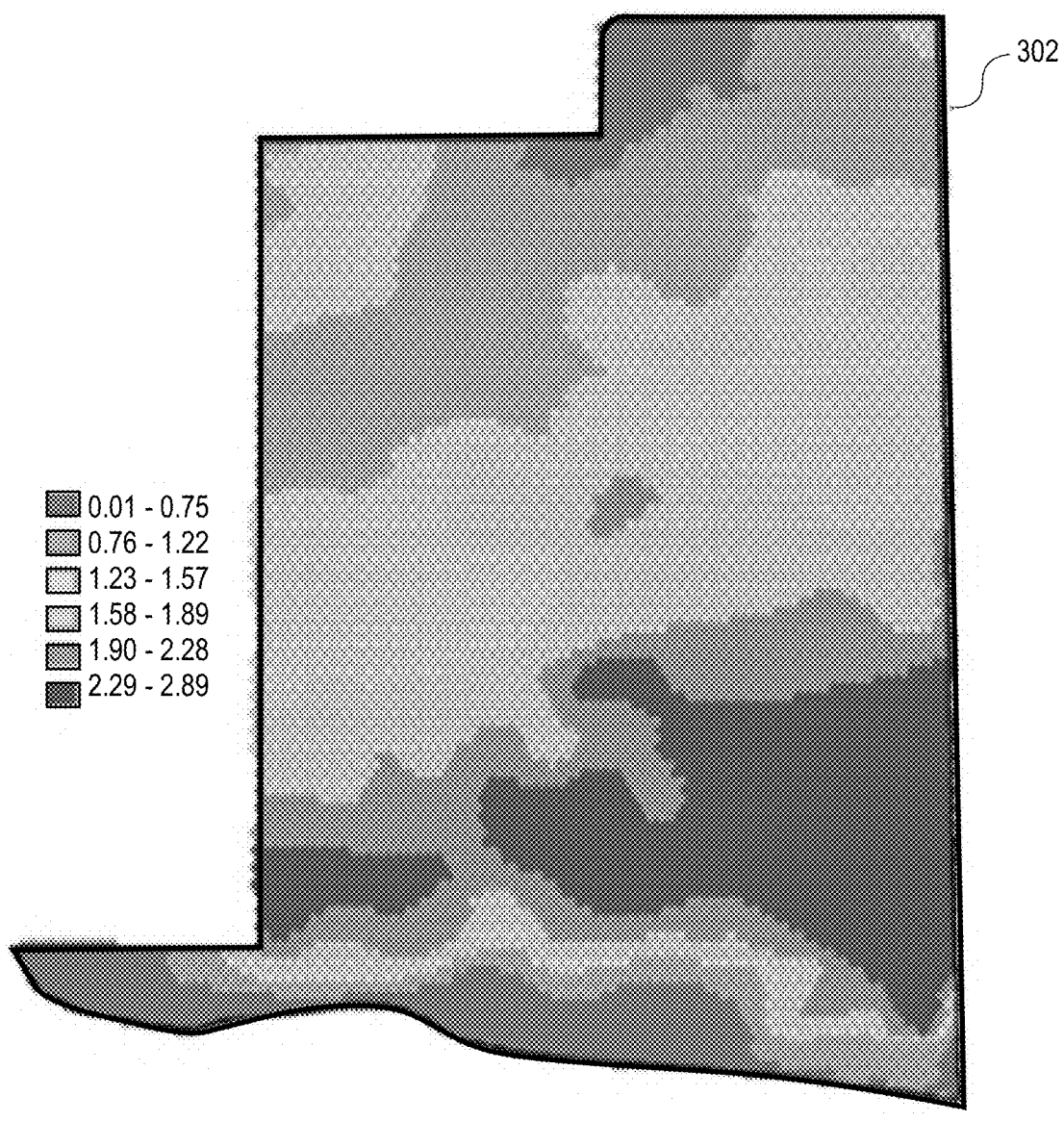
FIG. 3 depicts an exemplary relative elevation plot with respect to the exemplary soil data sampling environment of FIG. 2, according to one embodiment and scenario.
Figure 4A:
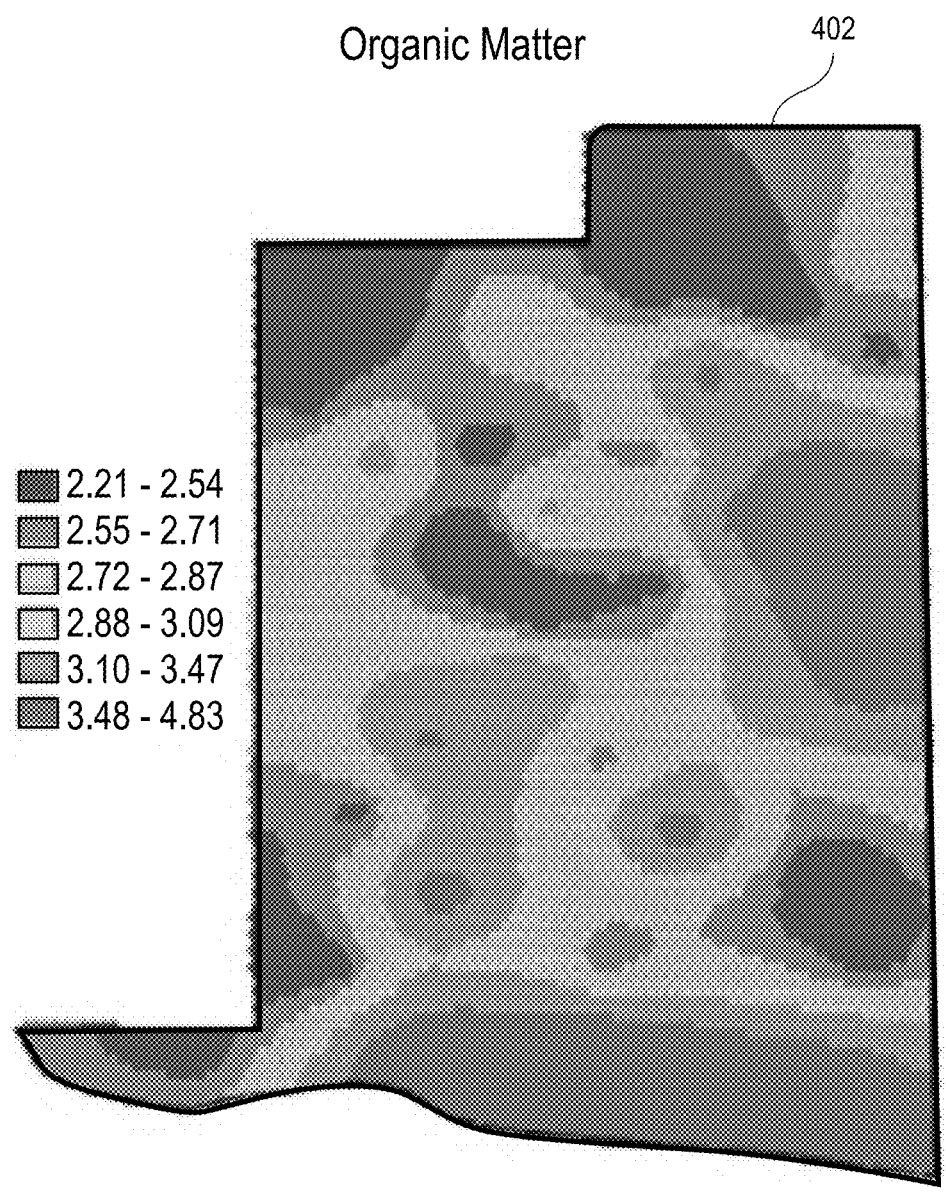
FIG. 4A depicts an exemplary organic matter plot with respect to the exemplary soil data sampling environment of FIG. 2, according to one embodiment and scenario.
Figure 4B:
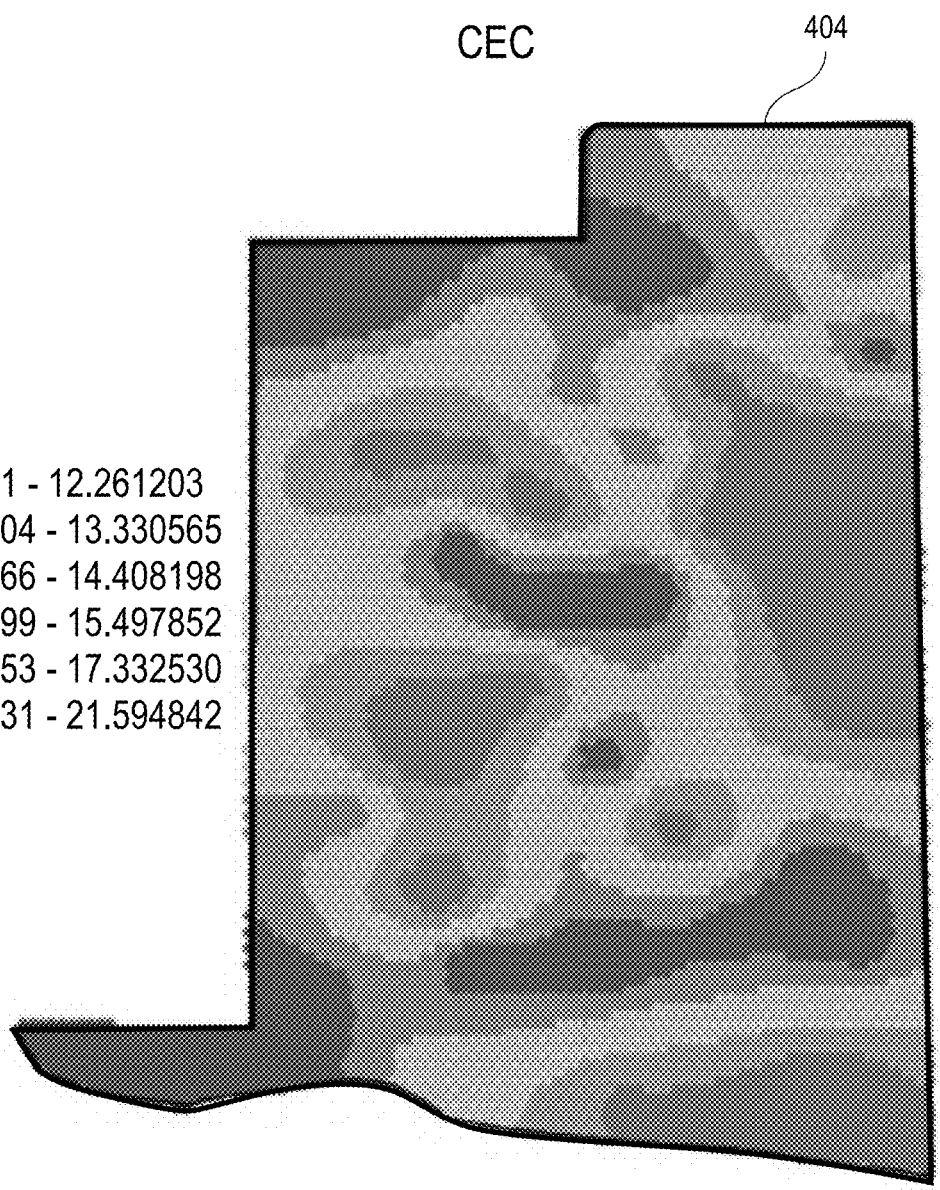
FIG. 4B depicts an exemplary cation exchange capability plot with respect to the exemplary soil data sampling environment of FIG. 2, according to one embodiment and scenario.
Figure 4C:
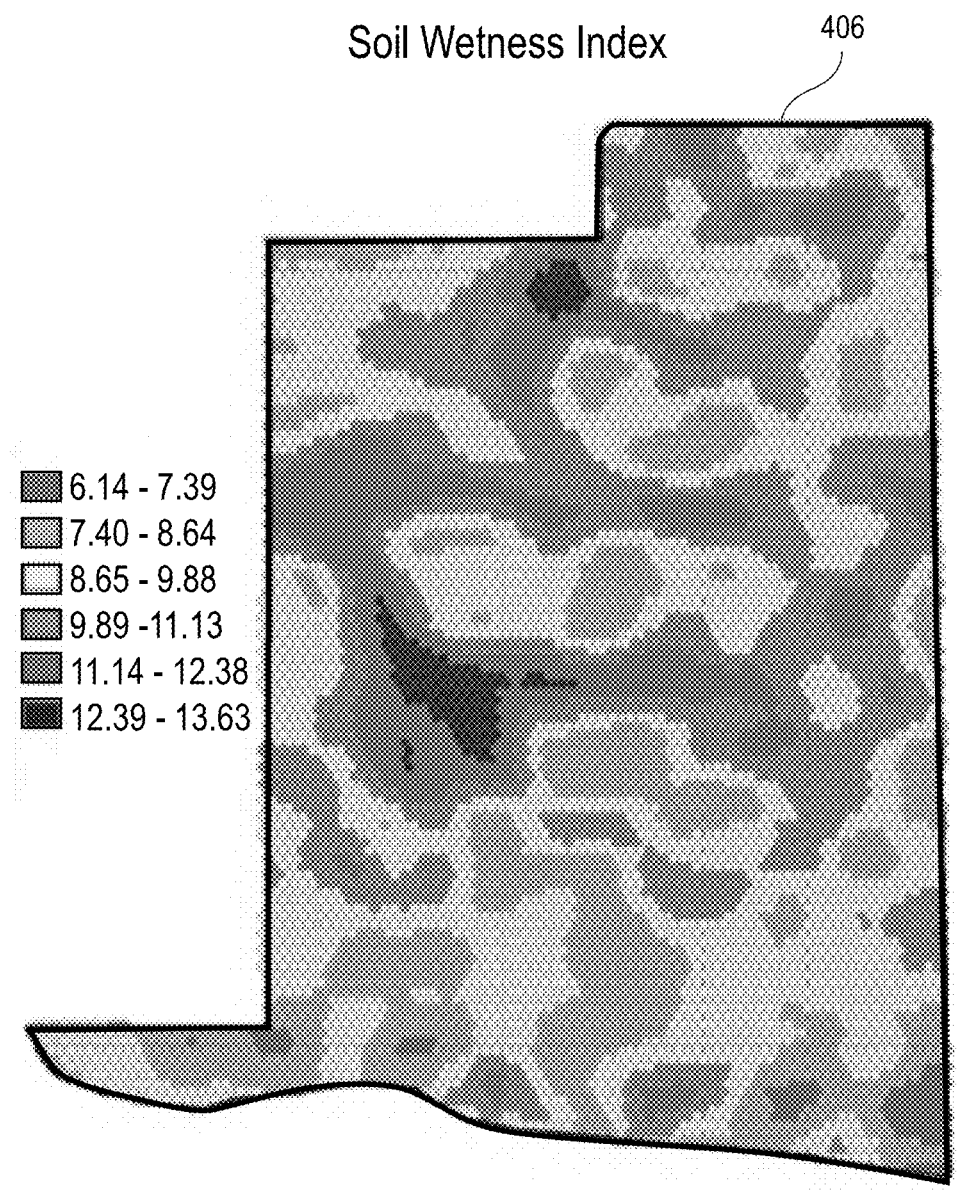
FIG. 4C depicts an exemplary soil wetness index plot with respect to the exemplary soil data sampling environment of FIG. 2, according to one embodiment and scenario.

FIG. 3 depicts an exemplary relative elevation plot 300 including a map layer 302 that contains a plurality of hexagrids, each including a respective elevation in meters, according to an embodiment. The plurality of hexagrids may correspond to the hexagrids computed during the interpolation of the exemplary soil data sampling environment 200 of FIG. 2. FIG. 4A depicts an organic matter plot 400 including a map layer 402 that corresponds to the map layer 302 of FIG. 3, according to an embodiment. In FIG. 4A, each hexagrid includes a respective elevation in meters. The hexagrids composing the map layer 402 may correspond directly to the hexagrids composing the map layer 302, in some embodiments. FIG. 4B depicts a cation-exchange capacity plot 400, according to an embodiment. The cation-exchange capacity plot 400 includes a map layer 404, which contains hexagrids that correspond to those of FIG. 4A and FIG. 4B. FIG. 4C includes a soil wetness index plot 400, according to an embodiment. The soil wetness index plot 4500 includes a map layer 406, the hexagrid values of which may correspond directly to hexagrids of FIG. 3 and FIGS. 4A-4B.

In sum, FIGS. 3, 4A, 4B and 4C advantageously depict plots having map layers that may be combined in one or more plots to provide a rich data view of hexagrids within an agricultural field. The organic matter and cation exchange layers of FIGS. 4A and 4B, respectively, may be determined by the field attributes module 154 analyzing machine data directly. The user viewing FIGS. 4A and 4B may gain an intuitive grasp of the organic matter and cation exchange properties of the entire field, even though only a small number of samples were taken. The soil wetness index map layer 406 of FIG. 4C may be generated by the topography and soil module 152 accessing secondary information sources (e.g., Lidar), as discussed above, and may provide insight into where water is flowing within the field. For example, a user viewing FIG. 4C may gain an intuitive understanding that water is flowing toward darker areas, and away from lighter areas within the field. Thus, the present techniques are seen to improve the computerized display of interpolated soil property information based on limited sampling.

Figure 5A:
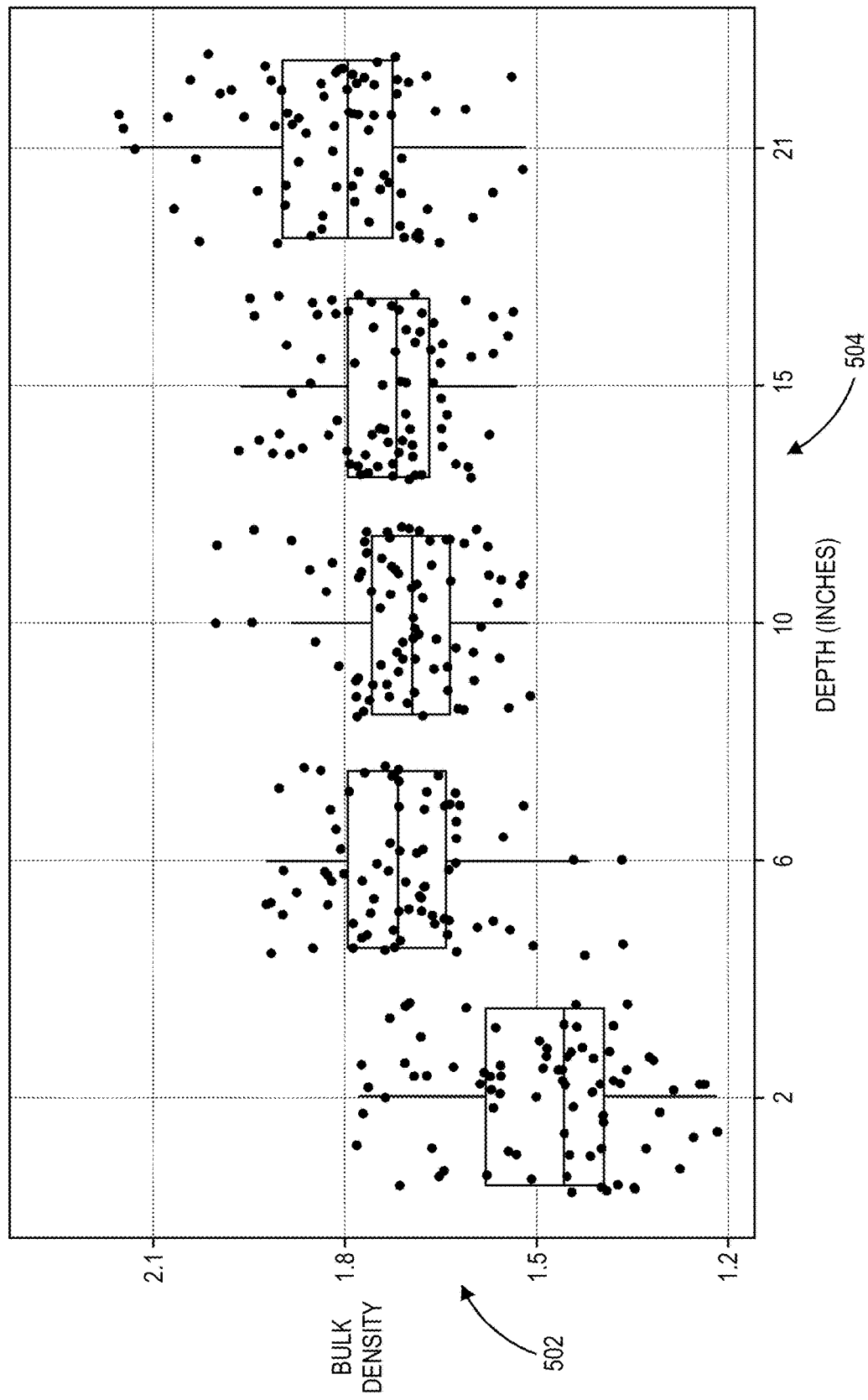
FIG. 5A depicts an exemplary plot of bulk density and depth with respect to the exemplary soil data sampling environment of FIG. 2, according to one embodiment.
Figure 5B:
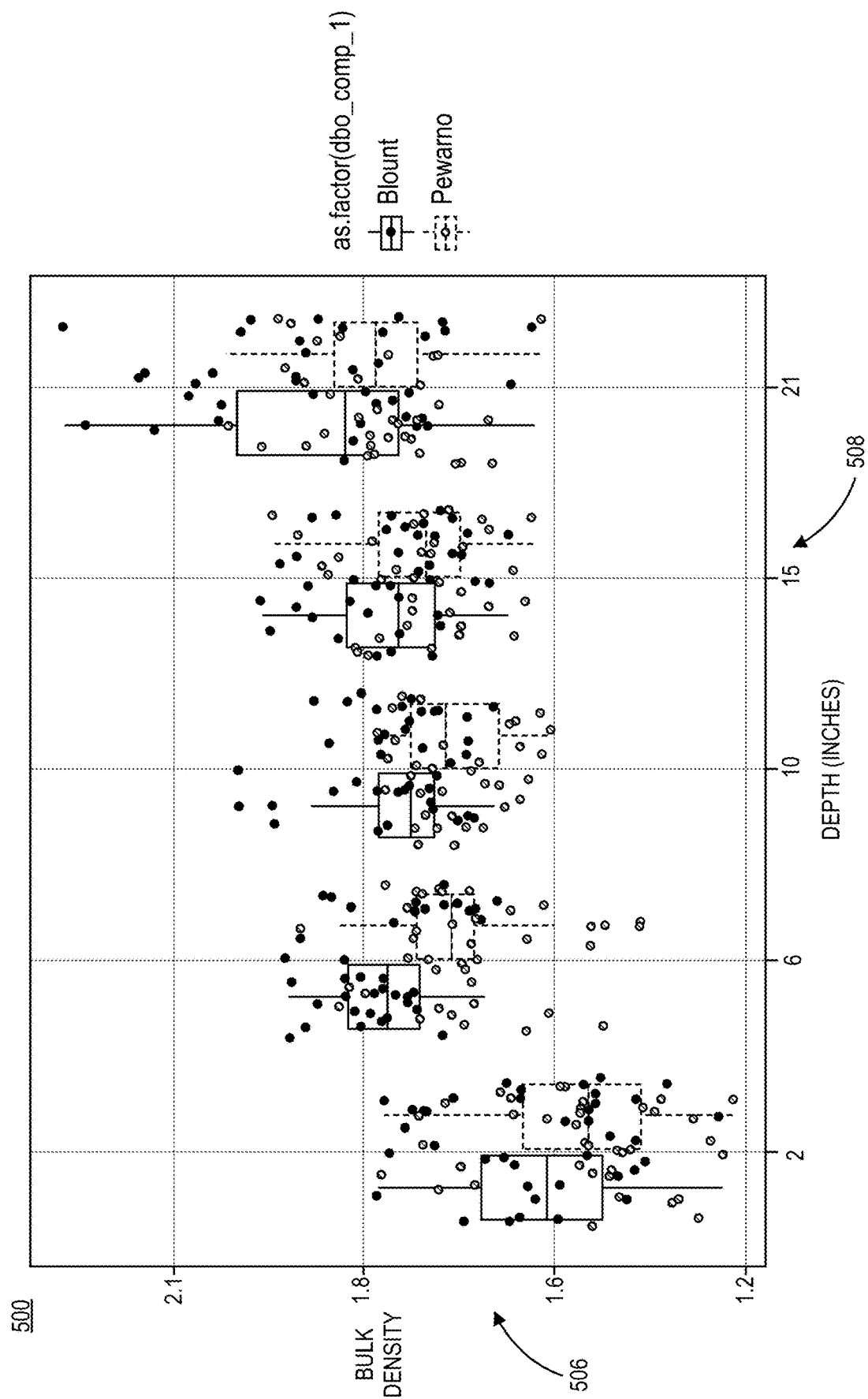
FIG. 5B depicts an exemplary plot of bulk density and depth according to soil series with respect to the exemplary soil data sampling environment of FIG. 2, according to one embodiment.

The present techniques include further useful soil data visualizations. For example, FIG. 5A depicts bulk density as a function of field depth, wherein the lowest bulk density is found at the surface, and the bulk density is seen to increase and remain relatively constant across the range of depths from six inches onward, unaffected by field depth. FIG. 5B depicts information similar to that of FIG. 5B. However, FIG. 5B may separate data according to soil series corresponding to Pewarno and Blount, respectively. If anything, the amount of overlap contained in the whisker plot of soil series in FIG. 5B demonstrates that soil series/type, alone, is not sufficient as a means for separating areas of a field. To effectively manage field variability, additional understanding of field variability may be necessary, beyond mere soil type. Nonetheless, the visualizations of FIGS. 5A and 5B represent improvements over conventional methods that make assumptions regarding bulk density at the field level, and enable interested parties to make sense of field and sub-field level data.

Figure 6:
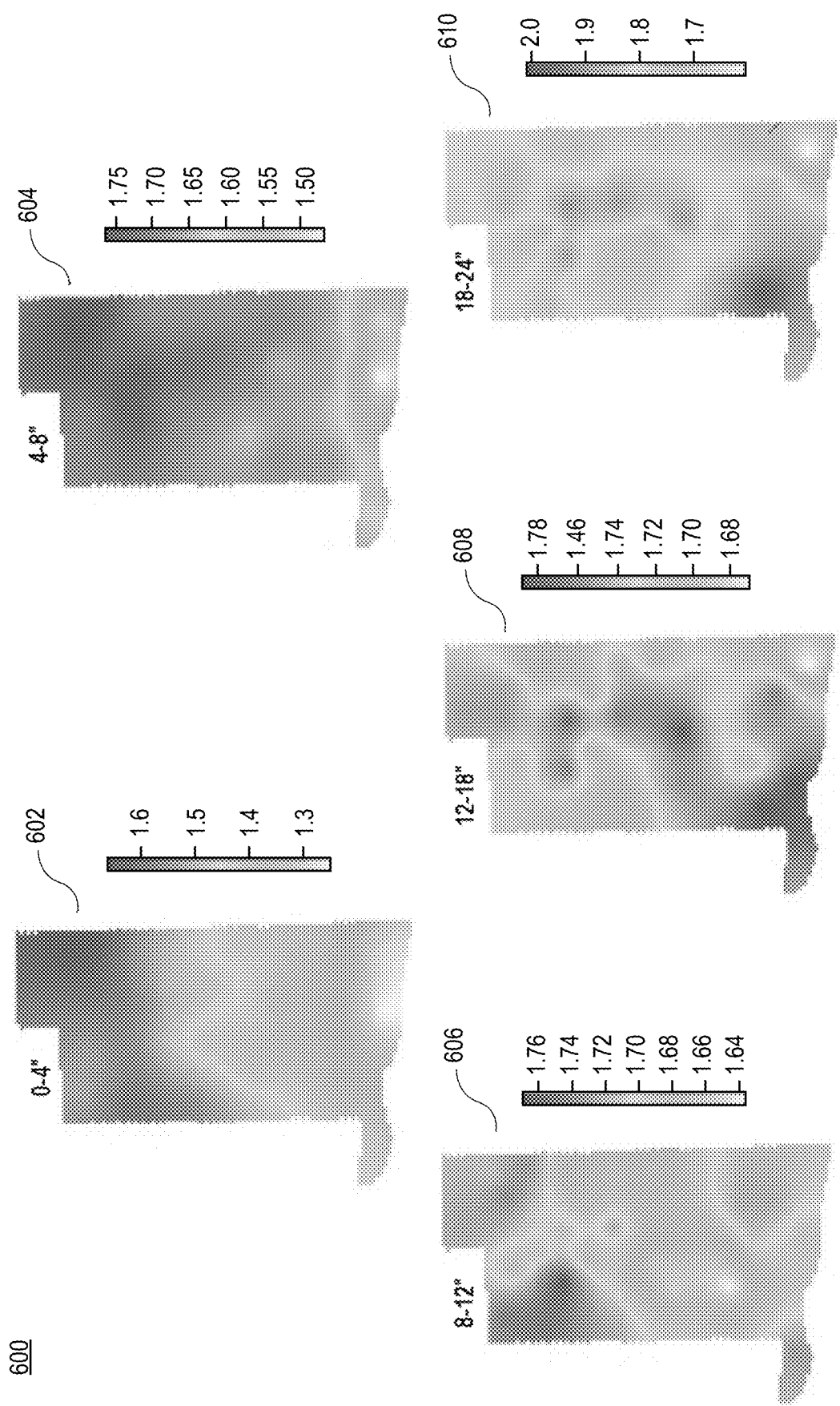
FIG. 6 depicts exemplary plots depicting soil variability at various depths with respect to the exemplary soil data sampling environment of FIG. 2, according to one embodiment.

FIG. 6 depicts a series of bulk density plots 602-610, according to an embodiment. The present invention improves on conventional bulk density visualization techniques, by depicting variability of bulk density in terms of grams/cm$^3$ in a plurality of map layers at different depths. By viewing the multiple map layers the user can quickly ascertain that the first four inches include the most variability, followed by inches 18-24. This is the case due to the fact that the largest range is seen in the range of approximately 1.25-1.7 grams cm$^3$, where the least variability is seen in other depth ranges, having more uniform bulk density overall. As noted, soil physical properties such as bulk density are conventionally expensive to quantify. By processing machine data sample data to determine rich mapping layers such as those depicted in FIG. 306, the present techniques provide significant advantageous improvements over conventional approaches to modeling soil properties and processes.

Exemplary Hexagrid Data Collection Embodiment

FIG. 7 depicts an exemplary growing environment 700 including a field 702 and a hexagrid cell 704, according to an embodiment. The field 702 includes a plurality of line features 706-A and a plurality of observations 706-B. The hexagrid cell 704 includes a plurality of line features 708-A and a plurality of observations 708-B. In some embodiments, the tractor module 156 may align the hexagrid cell 701 with the line features 707-A and/or 708-A, to enable additional analysis. The tractor module 156 may match the GPS heading of the tractor with each of the observations 706-B and 708-B, for example, to process the observations into line features. That is, the line features 706-A and 708-A may not be present in the original data.

In some embodiments, the tractor module 156 may access one or more observations and/or parameters in a device (e.g., the Farmobile PUC device) to predict soil physical properties. Examples of parameters that the tractor module 156 may access include crop yield, planting data, machine performance parameters (e.g., fuel burn, draft sending, engine torque, etc). The tractor module 156 may generate one or more line features corresponding to observations of the tractor module 156, and store the accessed parameters in the database 180, for example.

The prediction module 158 analyze data determined by the field attributes module 154 and the tractor module 156, inter alia, to generate one or more predictions. For example, the prediction module 158 may analyze an intersection of one or more line feature with the hexagrid to predict fuel usage and engine torque in the hexagrid. Two adjacent hexagrid cells may be, for example, 8.5 meters, from center to center. A plow/disk of tillage equipment may be known to be, for example, 14 feet wide. For example, the prediction module 158 may compute the line feature 708-A as a percentage of the width of the hexagrid 704, and scale a prediction based on this ratio. For example, the prediction module 158 may determine the amount of work expended by the engine of the implement 104, by computing a direct representation of draw bar load as the implement 104 traverses the field, or with respect to historical machine data. The prediction module 158 may determine the amount of work with respect to one or more observations in machine data. Once line features in the machine data are aligned with one or more hexagrids, the amount of work may be scaled according to the membership of the one or more observations within a given hexagrid. The prediction module 158 may include generating plots representing the draw bar load, as shown below.

Exemplary Operating Engine Torque Measurement Embodiment

Figure 8:
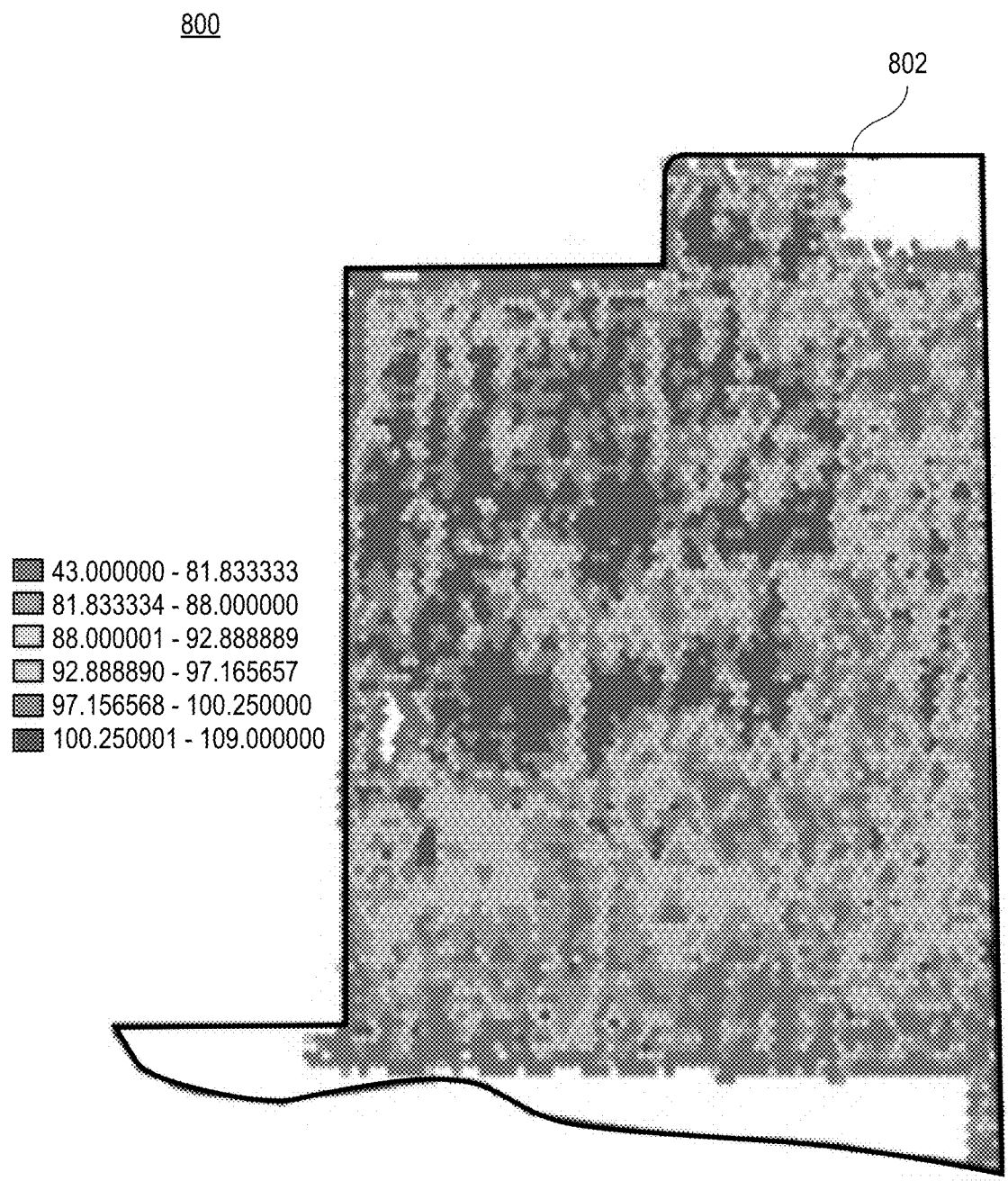
FIG. 8 depicts an exemplary engine torque plot with respect to the exemplary soil data sampling environment of FIG. 2, according to one embodiment.

FIG. 8 depicts an exemplary engine torque plot 800 including a map layer 802 that includes a plurality of hexagrids, according to an embodiment. The map layer 802 may correspond, for example, to the map layers 602-610 of FIG. 6, the map layers 406, 404, and 302. The map layer 802 may depict engine torque of an implement traversing the field 202. Thus, for example, the map layer 802 may include darker values representing higher torque (i.e., a harder working engine) and lighter areas representing an engine under less load.

The map layer 802 may be a direct reflection of operating torque as a percentage of the engine. The map layer 802 is indicative of the soil conditions that the implement (e.g., tractor, ripper, etc.) experience during traversal of the field 202, at given hexagrid positions. Thus, the map layer 802 advantageously provides a user with a quantitative measure of drawbar load experienced by the implement (e.g., implement 104 of FIG. 1). The torque data may be collected, in some embodiments, by the remote computing device 106 accessing information in a cloud server, via the network 108.

The present techniques further contemplate relating torque to drawbar pull, to infer additional information. For example, the prediction module 158 may include instructions for computing a relationship between torque and drawbar pull for one or more specific tractor models. For example, the prediction module 158 may select tractor information corresponding to a tractor model (e.g., a John Deere 8370RT) via the tractor module 156 in the database 180. The selected tractor information may include tractor attributes, such as horsepower, torque, drawbar pull, max torque, max torque rise, max drawbar pull, torque at rated speed of 2100 revolutions per minute, etc. The prediction module 158 may render such information in a visual format (e.g., in a graph/plot, as shown in FIG. 9).

Figure 9:
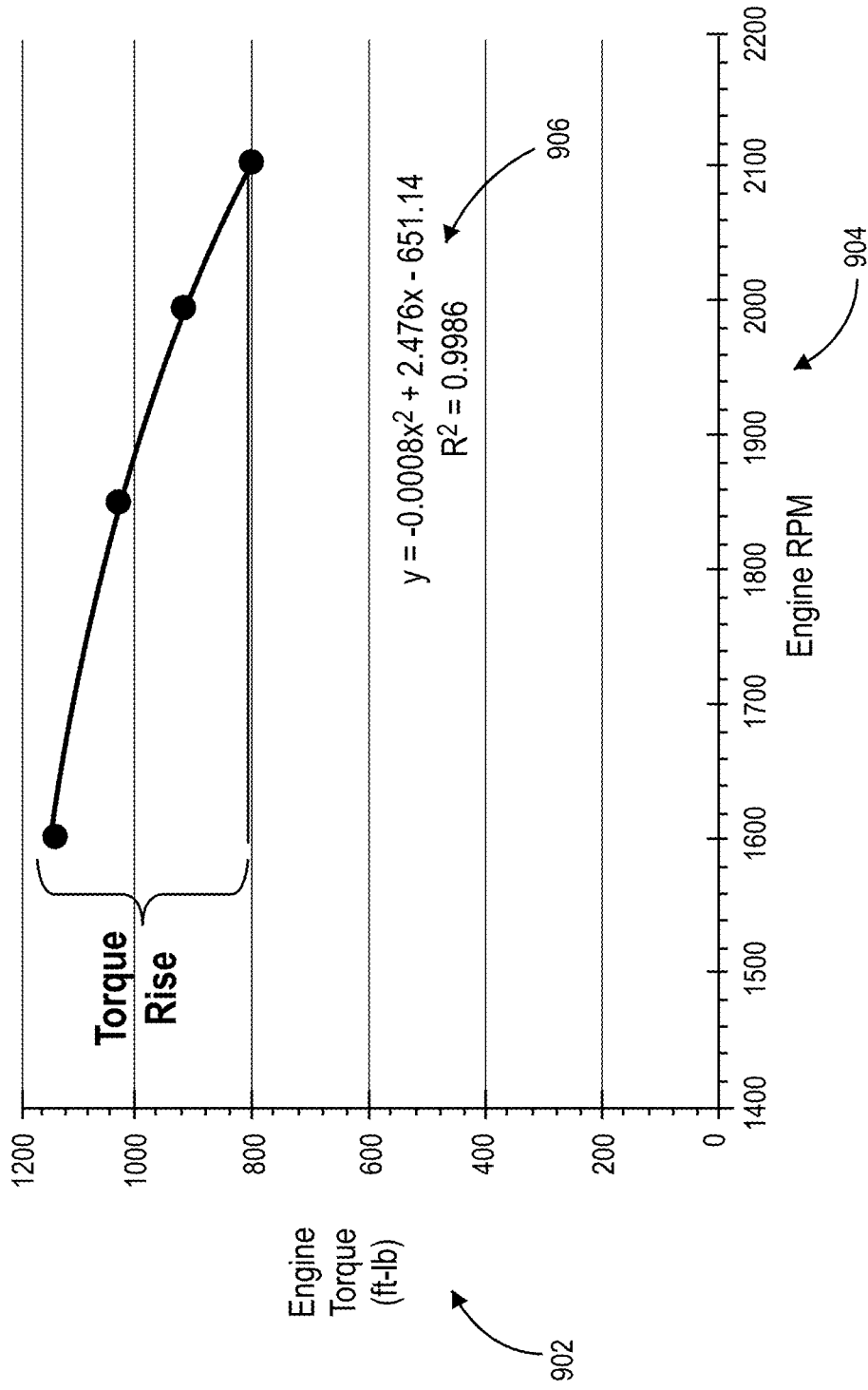
FIG. 9 depicts an exemplary plot of engine torque and engine revolutions-per-minute, according to one embodiment.

Specifically, FIG. 9 depicts an exemplary plot 900 of engine torque and engine revolutions-per-minute (RPM) first axis 902 depicting engine torque and a second axis 604 depicting engine RPM, and a slope-intercept equation 906 describing the torque rise for the selected model of tractor, according to an embodiment. Of course, the example is simplified for explanation, and many other published farm equipment test results may be obtained. The plotting of engine torque and engine RPM as in FIG. 9 may advantageously enable an end user to determine the torque engine rise, load on the drawbar that causes an RPM decrease and torque increase, as well as what the drawbar pull is at the time the tractor reaches maximum torque.

The present techniques include instructions for even further modeling drawbar load of a given piece of equipment based on speed, width, depth and soil conditions. Specifically, an equation is given as $$D=F_i*[A+B(S)+C(S^2)]*W*TD$$

wherein D is equal to the implement draft in foot-pounds; F is a soil texture adjustment parameter; A, B and C are machine-specific parameters; S is field speed; W is machine width and TD is tillage depth.

In some embodiments, the prediction module 158 may implement the equation, choosing the soil texture adjustment parameter and/or implement draft parameter on the basis of the following:

| Soil characteristics | Soil texture adjustment parameter | Implement draft (lb/ft) |
| --- | --- | --- |
| Fine texture | $F_1(1.0)$ | 36,040 |
| Medium texture | $F_2(0.70)$ | 25,228 |
| Coarse texture | $F_3(0.70)$ | 16,218 |

Additional and/or different parameters may be used, in some embodiments.

Using the above-referenced equation, the prediction module 158 may compute drawbar loads using speed, width, depth and soil conditions as inputs. The prediction module 158 models have been empirically related to that are in concordance with known source estimates, such as those provided by the American Society of Agricultural and Biological Engineers. Thus, the prediction module 158 may model drawbar load estimates based on engine performance data. In other words, the prediction module 158 may, given torque percentages, infer pounds of force exerted against the drawbar of a tractor using tillage equipment. The inferred torque may be displayed for the benefit of the user.

Figure 10:
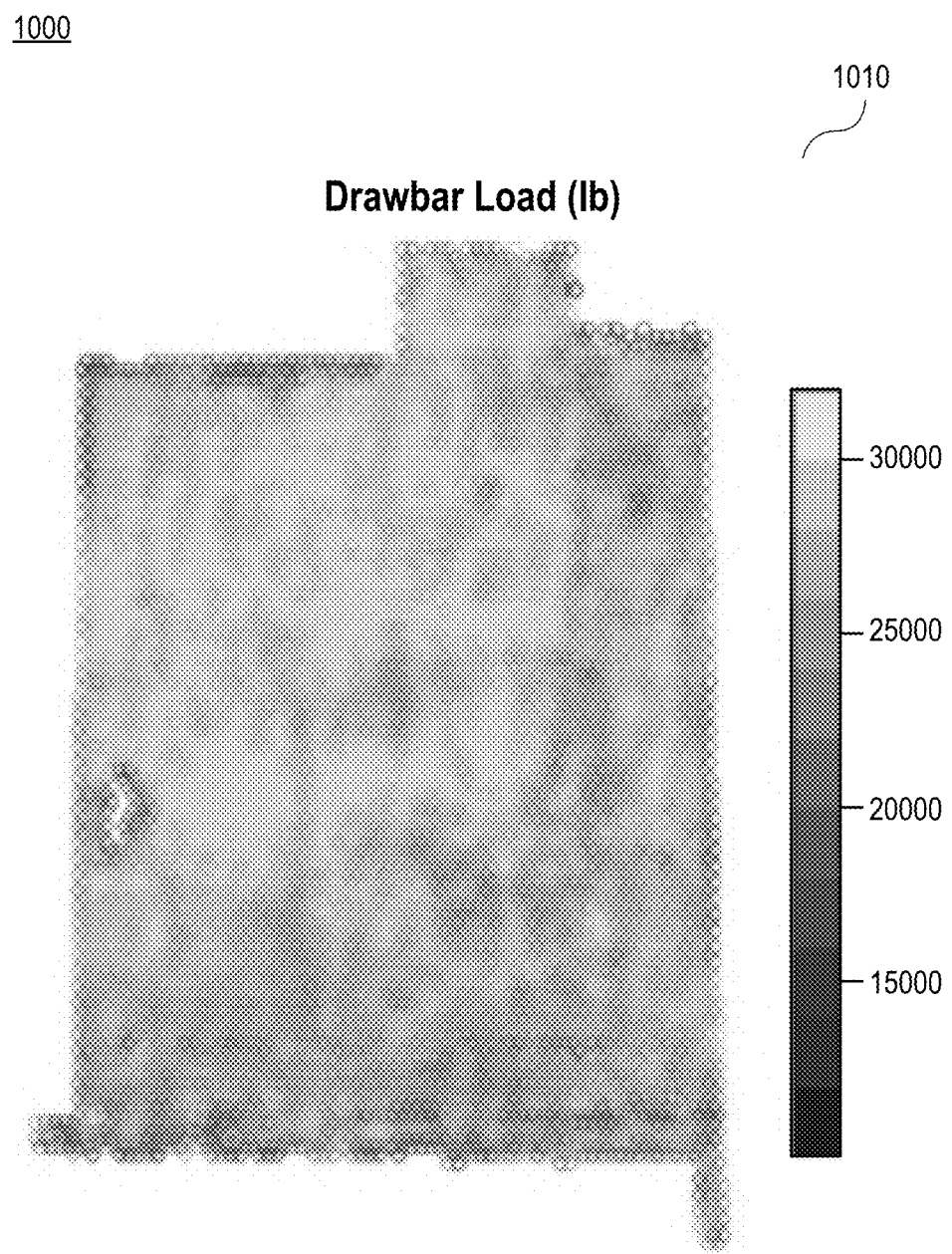
FIG. 10 depicts an exemplary plot of drawbar pull with respect to the exemplary soil data sampling environment of FIG. 2, according to one embodiment.

For example, FIG. 10 depicts an exemplary plot 1000 of drawbar load in foot-pounds, according to an embodiment. The plot 1000 includes a plurality of hexagrids corresponding to the plurality of hexagrids in the environment 200.

Exemplary Draft Analysis Embodiments

Figure 11A:
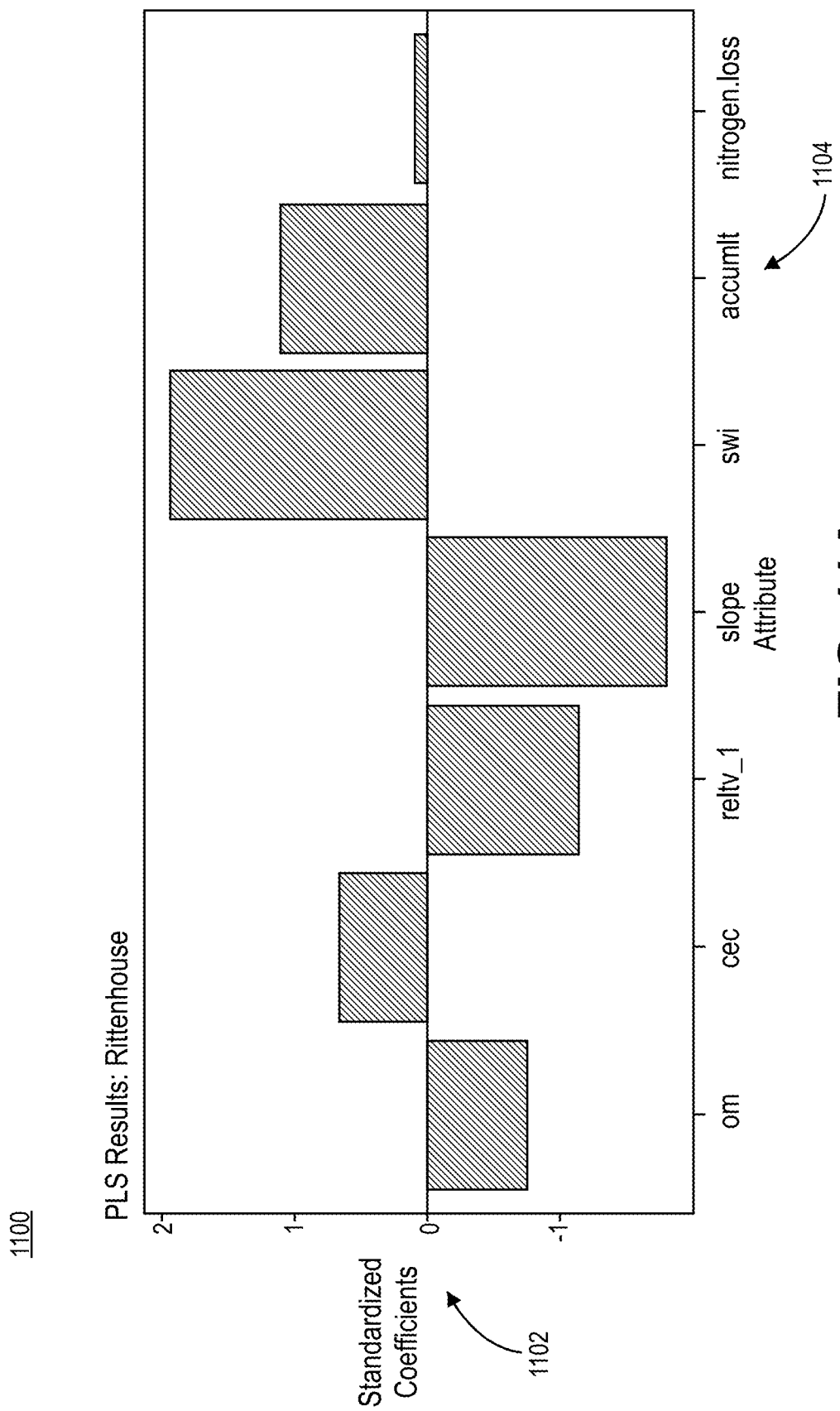
FIG. 11A depicts an exemplary plot of partial-least-squares coefficients, according to one embodiment.

Once drawbar load is computed using the techniques described above, the grower or trusted advisor may seek to understand the root causes of increases in draft. The present techniques include additional visualization aspects that advantageously improve draft analysis, by bringing forth meaning from noise. For example, FIG. 11A depicts an exemplary plot 1100 of partial-least-squares coefficients, according to one embodiment. The prediction module 158 may include instructions for computing one or more PLS attributes, including a respective coefficient for each PLS attribute. In the PLS analysis, response variables may be engine torque and/or environmental attributes (e.g., relative elevation, slope, organic matter, cation-exchange capability, nitrogen loss potential, flow accumulation, soil wetness index, etc.). In the example depicted in plot 1000, soil wetness index, flow accumulation and cation exchange capability are observed to have provided increased engine torque, whereas increasing organic matter, elevation, and slope provided reduced engine torque.

The prediction module 158 may include instructions for rendering and displaying one or more graphical user interfaces, for example, in the client computing device 102. In some embodiments the client computing device 102 may be a mobile device (e.g., a smart phone, a tablet, a laptop computer, etc.) of the user. The instructions may include instructions for displaying the relative elevation plot 300 of FIG. 3, or any of the plots of FIGS. 4A-FIG. 6 and FIG. 8, FIG. 10 and FIG. 11A. The plot 1100 may prove especially advantageous to end users who, upon viewing it, may be enabled to understand attributes of the field that affect increased drawbar load (e.g., the cation exchange capability, soil wetness index, and nitrogen loss attributes).

Figure 11B:
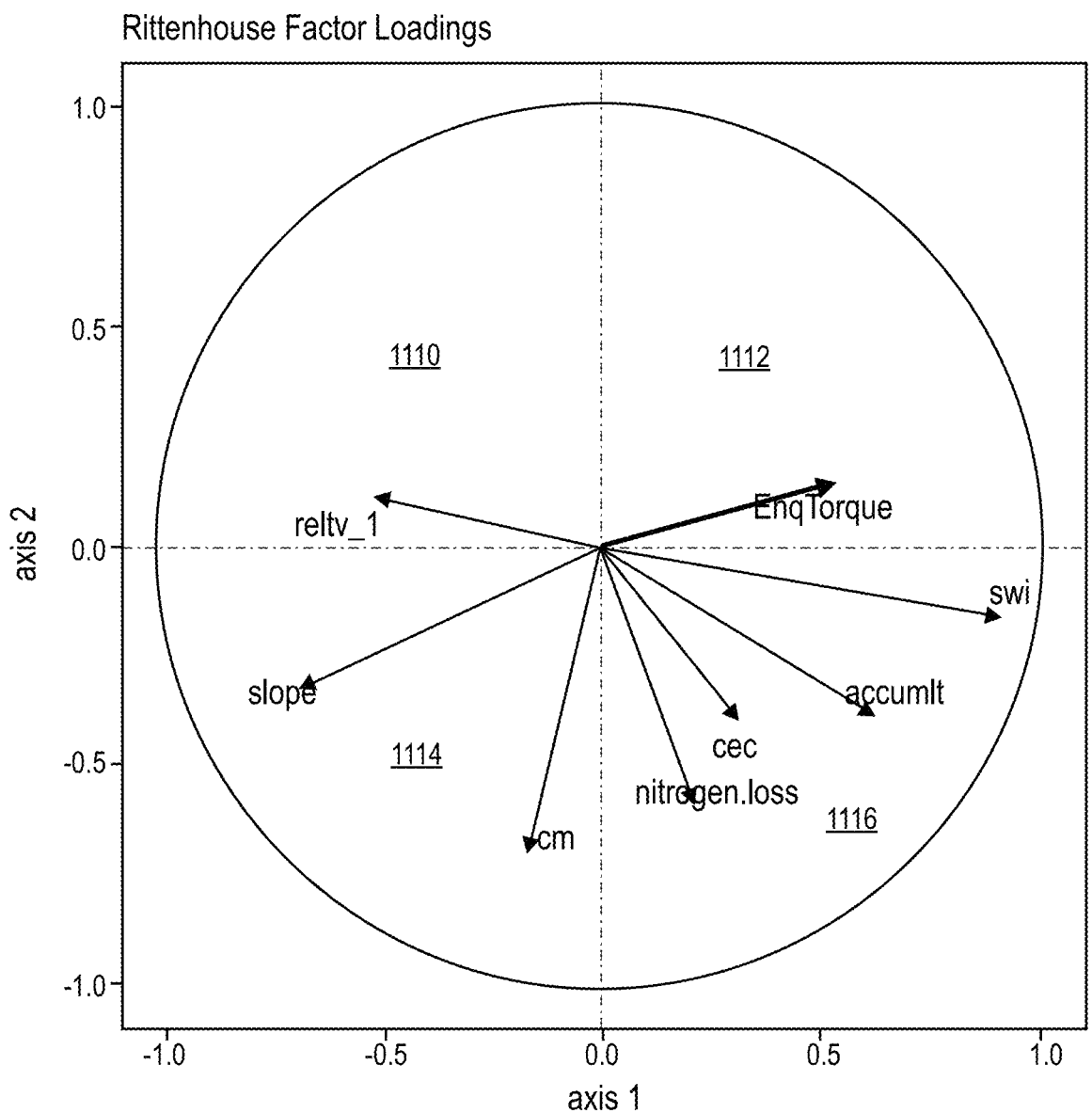
FIG. 11B depicts an exemplary plot of partial-least-squares factor loadings, according to one embodiment.

FIG. 11B depicts a factor loading plot 1100 including the coefficients of the plot 1100 in FIG. 11A, according to one embodiment. The factor loading plot 1100 includes an indication, in quadrants 1112 and 1116 that increased engine torque is positively correlated with nitrogen loss, cation exchange capability, soil wetness index, and flow accumulation, as noted. Quadrants 1110 and 1114 provide similar indications that increased engine torque is negatively correlated with organic matter, slope, and relative elevation.

Figure 11C:
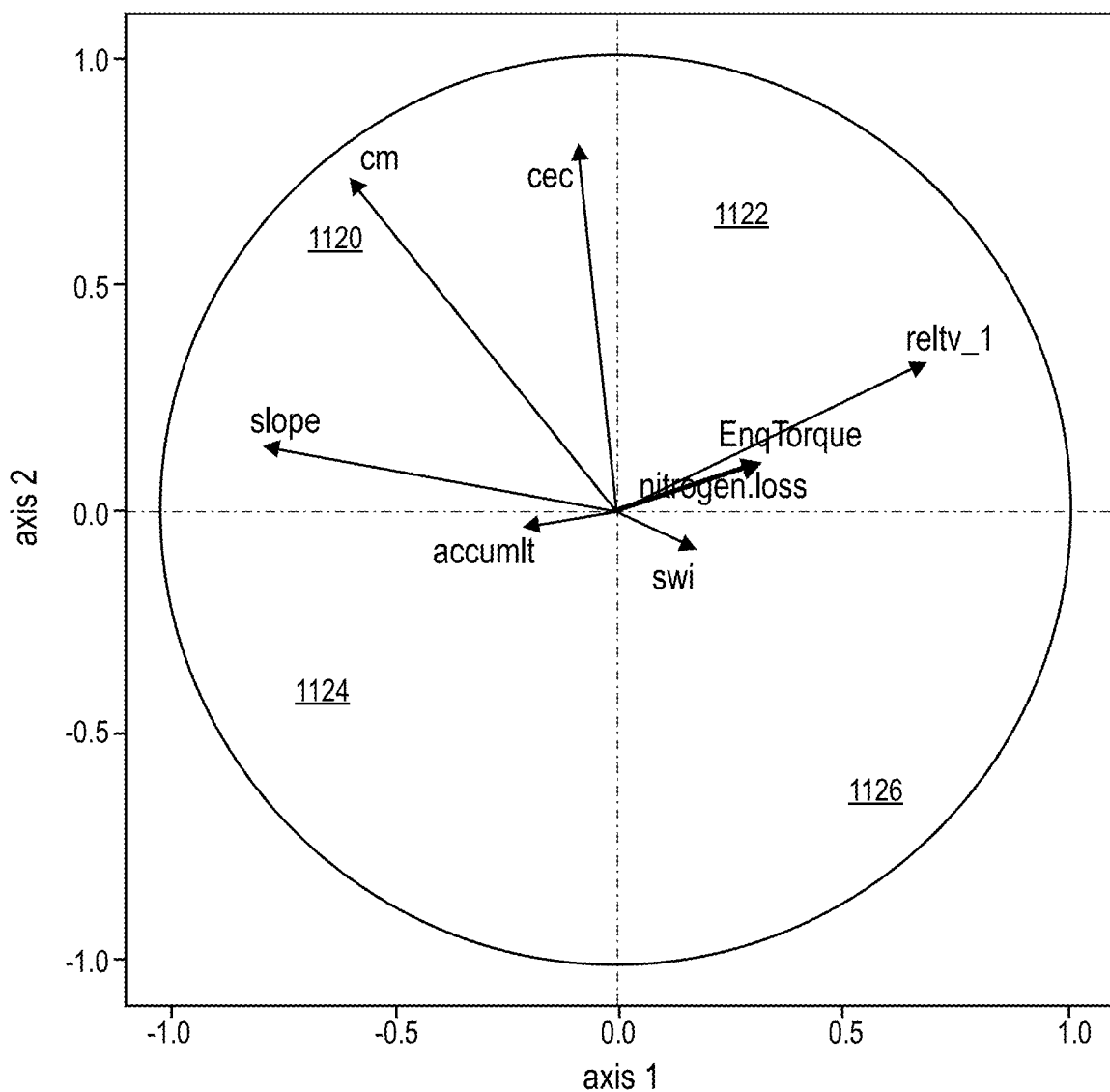
FIG. 11C depicts an exemplary plot of partial-least-squares factor loadings with engine torque equal to or exceeding 85%, according to one embodiment.

FIG. 11C depicts a factor loading plot 1100 that represents the same response variable and environmental attributes as FIG. 11A, when engine torque is less than a threshold value (e.g., 85%). In that case, a grower, trusted advisor or other party responsible for a field can readily determine that at lower torque values, flow accumulation is negatively correlated with torque, and soil wetness index is only weakly positively correlated. Thus, FIG. 11C enables the interested party (e.g., a grower, an agronomist, a field manager, etc.) to quickly determine the relevant factors at low torque.

Figure 11D:
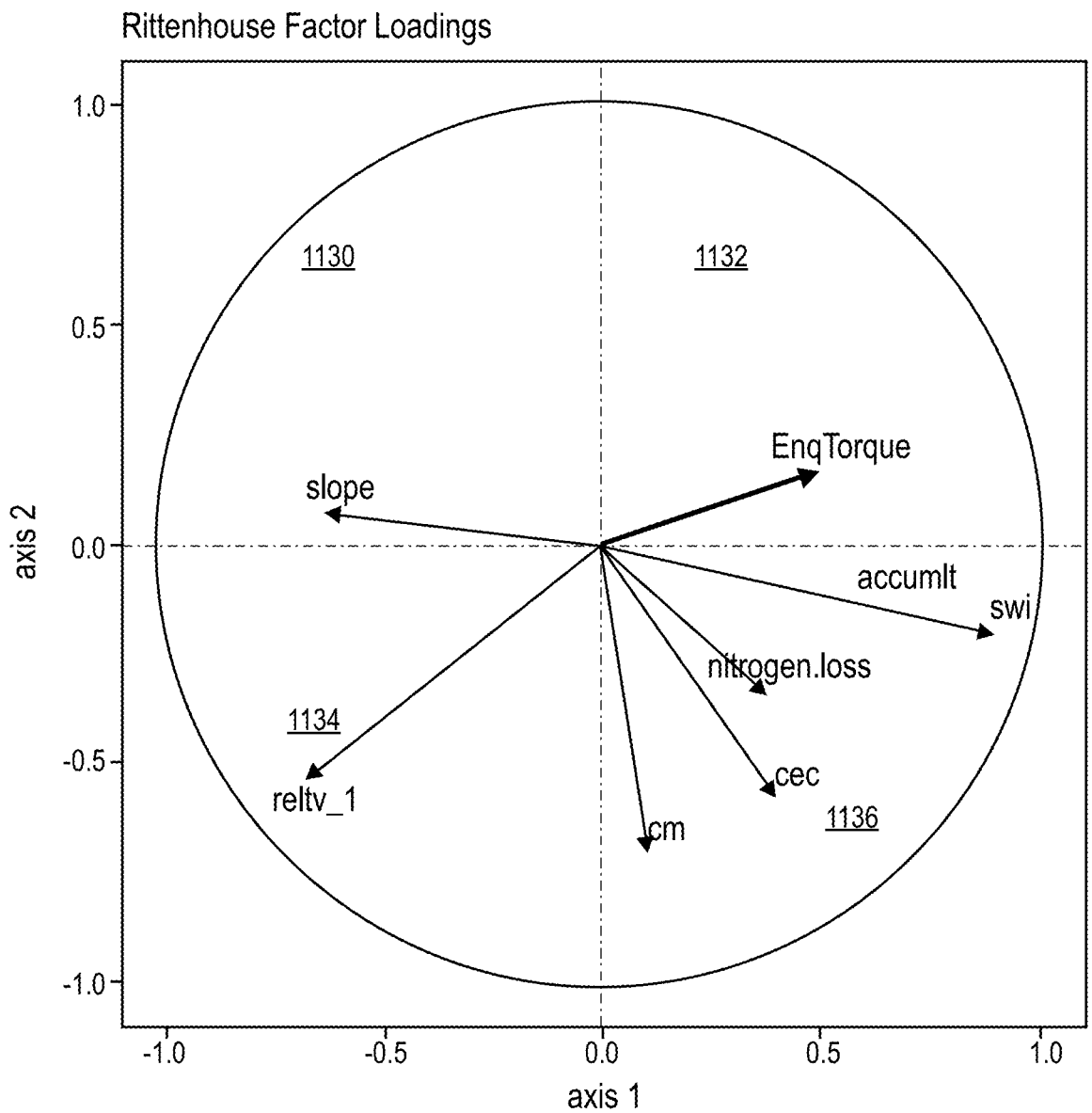
FIG. 11D depicts an exemplary plot of partial-least-squares factor loadings with engine torque less than 85%, according to one embodiment.

FIG. 11D depicts a factor loading plot 1100 that represents the same response variable and environmental attributes as FIG. 11C, when engine torque exceeds a threshold value (e.g., 85%). The factor loading strongly resembles that of FIG. 11B. It should be appreciated that the prediction module 158 may perform selection of an appropriate threshold, such that responses above and below the threshold are divergent. In general, by presenting the user with flexible visualizations of the effect of multiple variables on engine torque, the present techniques advantageously enable the user to intuitively grasp the effect of various variables, thereby improving performance of agricultural factor analysis. Engine load may be further analyzed to generate soil health/soil strength metrics.

Exemplary Field Sustainability Embodiments

As noted above, quantification of field sustainability is generally poor in precision agriculture. A particular lack of systematic knowledge and practice exists at the sub-field level regarding soil aggregate stability. For example, it is known that saturated conditions are detrimental to the growing environment. Such conditions may cause disaggregation of soil and nutrients, and result in anaerobic conditions of saturation, wherein nitrogen is lost due to microorganisms consuming oxygen from nitrates in soil. The resulting nitrogen gas may be released into the atmosphere, or be lost in runoff. Such disaggregation can also occur with other organic substrates in soil (e.g., magnesium, iron and sulfur). Therefore, it is in every grower's interest to understand what is occurring in each field in regard to aggregate stability and subsequent soil processes.

In the present application, soil aggregate stability may be analyzed, at the sub-field level, in order to increase overall field sustainability. In particular, the stability module 160 of the remote computing device 106 may include instructions for computing aggregate stability, a measurement of soil that expresses resistance of that soil to break down as a result of disruptive processes such as rainfall. The stability module 160 may analyze attributes of the soil of a field, including organic matter, collected in machine data by the client computing device 102 and received in the remote computing system 106. The stability module 160 may analyze external data sets in combination with the machine data. For example, the stability module 160 may include instructions for quantifying kinetic energy of rainfall, and accumulation over a season by computing the energy release in Joules of cumulative rainfall. Some rainfall events may produce more energy (e.g., four inches in 90 minutes) than other rain falls (e.g., one half inch in 90 minutes).

The stability module 160 may include further instructions for determining the respective impact of such events on soil of a particular field. Specifically, the stability module 160 may determine a starting aggregate stability of one or more hexagrids in a field based on analyzing one or more soil attributes in machine data (e.g., bulk density). The stability module 160 may then adjust the starting aggregate stability with respect to each of the one or more hexagrids in the field based on disruptive events. The resulting aggregate stability with respect to each hexagrid reflects how resistant the soil in each hexagrids is to disruptive changes. The overall stability of the field may be computed using an average, for example. The aggregate stability of hexagrids may be used as input to other modeling processes.

Figure 12A:
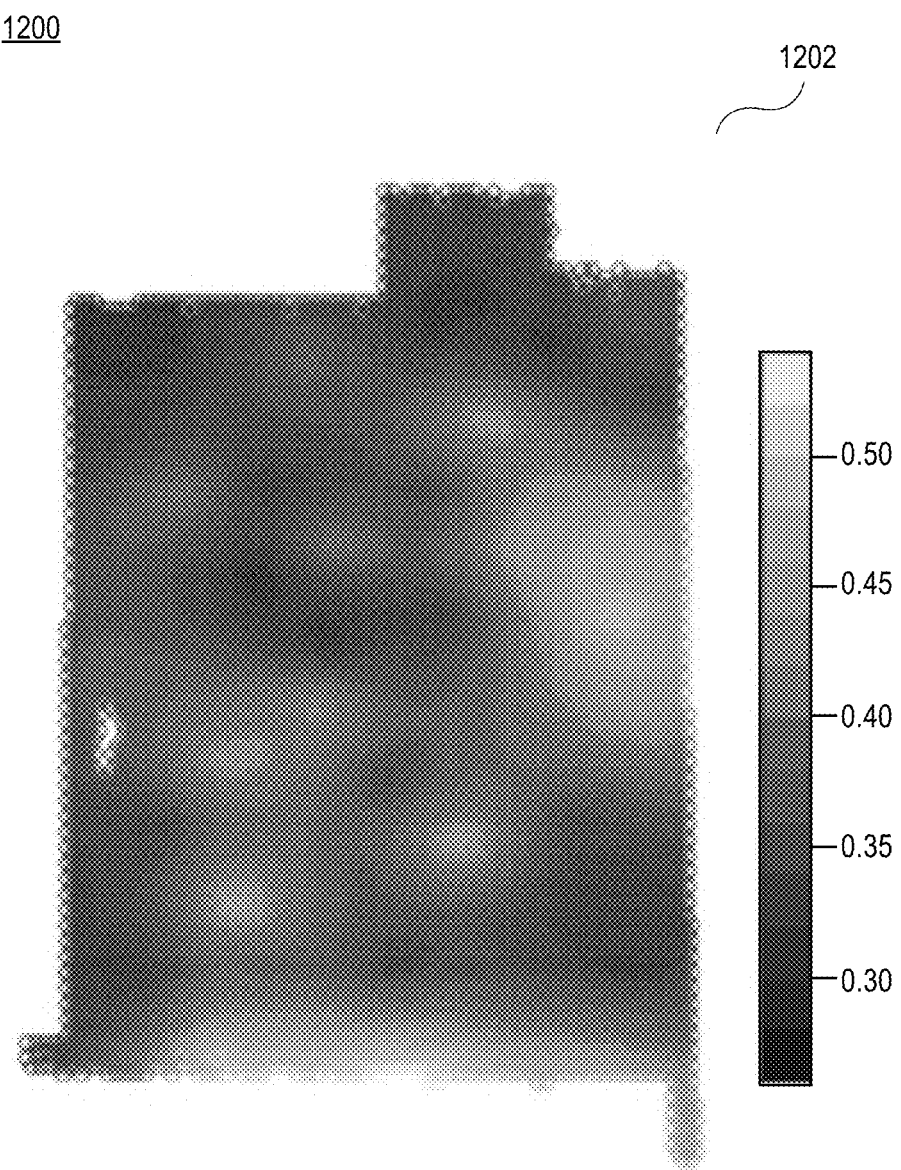
FIG. 12A depicts an exemplary plot of aggregate stability, according to one embodiment.

The sustainability module 160 may analyze machine data, and generate a map layer including a plurality of hexagrids, each including the respective aggregate stability value. For example, FIG. 12A depicts an aggregate stability plot 1200 including a map layer 1202 that may correspond to the map layer 302 of FIG. 3. In the map layer 1202, darker regions may correspond to lower aggregate stability values that are, thus, more susceptible to change than those that include higher aggregate stability values. The map layer 1202 may depict a relative rate of change denoted in unit energy of rainfall (e.g., $J/cm^2$). The map layer 1202 may reflect that higher aggregate stability areas of the field change slower than areas with lower aggregate stability. In sum, the present techniques improve conventional field analysis methods, by enabling interested parties to quantify potential of nutrients, non-point source pollution and resulting yield loss due to areas of low aggregate stability.

Figure 12B:
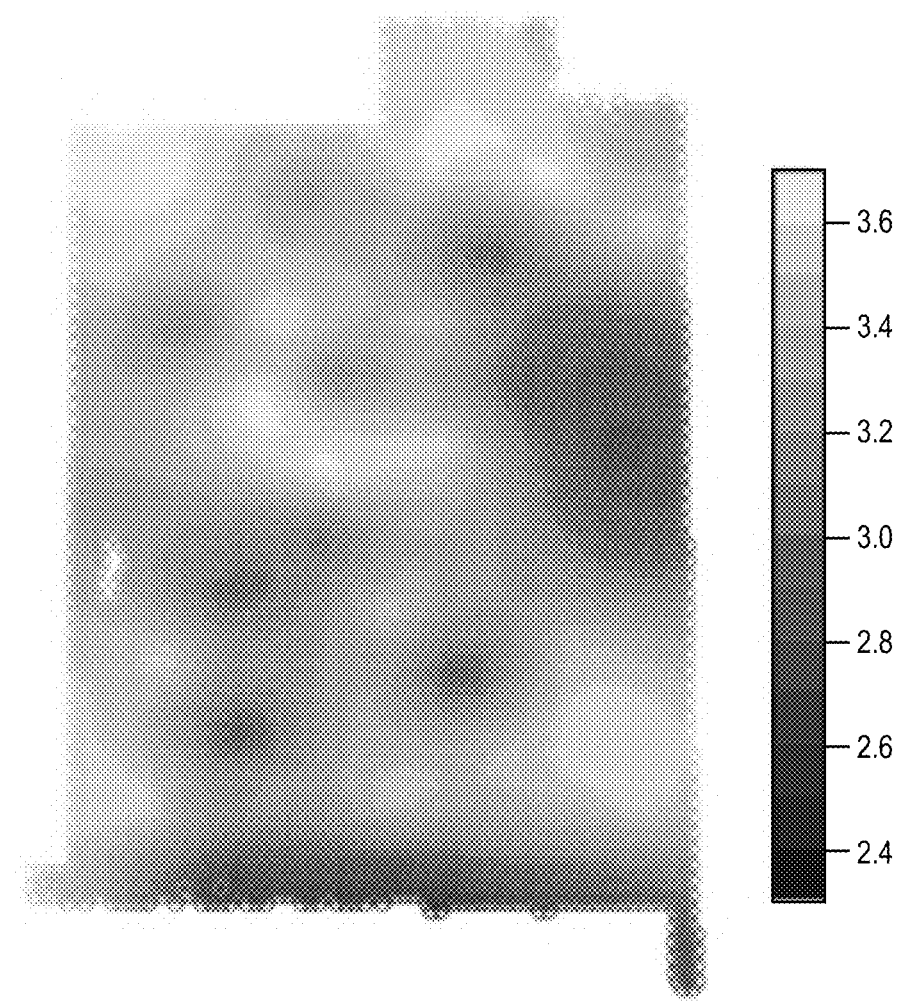
FIG. 12B depicts an exemplary plot of the rate of change in kinetic energy of rainfall, according to one embodiment.

FIG. 12B depicts an exemplary plot 1204 of the rate of change in kinetic energy of rainfall, according to one embodiment. The sustainability module 160 may generate the plot 1204 by analyzing the rate of change of soil physical properties. For example, the sustainability module 160 may receive and process cumulative rainfall data corresponding to a field (e.g., data from an external data source such as the United States Department of Agriculture). The processing may include determining a plurality of kinetic energy values with respect to the field. The sustainability module 160 may measure the rate of change in the plurality of kinetic energy values over time with respect to the field. The sustainability module 160 may generate the plot 1204, wherein the plot 1204 depicts a faster migration of soil properties to less favorable values. In other words, as the rate of change increases, for example, aggregate stability as reflected by FIG. 2A may decrease. As discussed above, when aggregate stability decreases, nutrient loss or other undesirable processes may occur. Thus, for example, by rendering a combined view of the map layers in FIG. 12A and FIG. 12B, the present techniques may enable the user to determine when a rate of change is associated with a loss of aggregate stability.

Figure 12C:
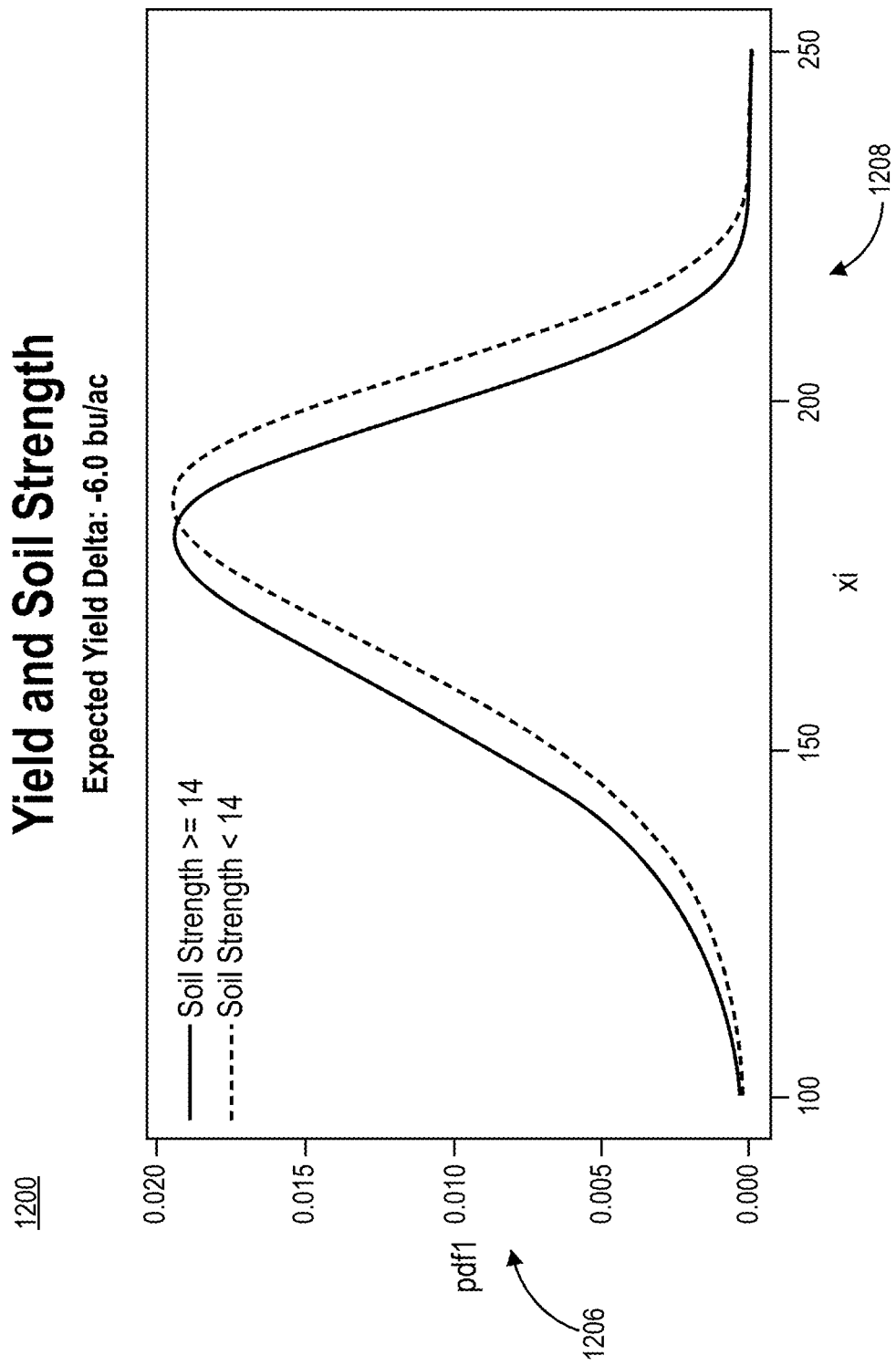
FIG. 12C depicts an exemplary yield probability plot, according to one embodiment.

In some embodiments, the yield and soil strength module 162 may infer a soil strength measurement. Specifically, the yield and soil strength module 162 may generate a probability distribution function in relation to expected yields at varying soil strengths. For example, FIG. 12C may include an exemplary plot 1200 including a probability distribution axis 1206 and an expected yield axis 1208. The plot 1200 may include multiple curves indicating the probability curve at different soil strengths, and importantly, the expected return in bushels/acre yield as between the different strengths. For example, in the exemplary plot 1200, a soil strength of less than a median value (e.g., 14) may indicate a gain of six bushels per acre. Thus, the present techniques include yet another advantageous benefit that of enabling the end user to determine the probable yield by visualizing different soil strengths. The yield and soil strength module 162 may render the plot 1200 and cause it to be displayed, for example, in the output display 124 of the client computing device 102 (whether installed in the cab of the implement 104 or in a mobile computing device of the user).

Figure 12D:
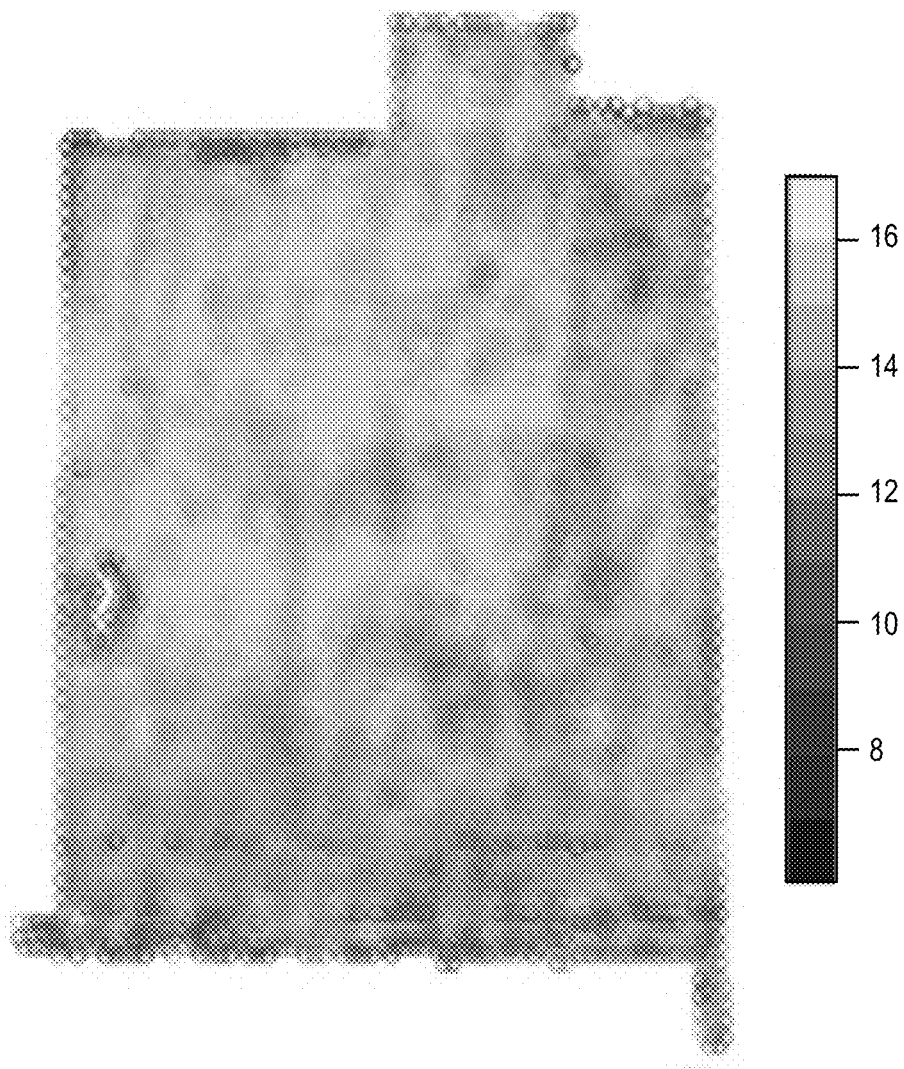
FIG. 12D depicts an exemplary soil strength, according to one embodiment.

The soil strength module 162 may display a plot 1200 including one or more inferred soil strength measurements. For example, FIG. 12D depicts soil strengths across hexagrids of a field that may correspond to the field of FIG. 2, in some embodiments. The respective soil strength of each hexagrid in the plot 1200 may be represented by shaded areas corresponding to relative soil strength denoted in kilojoules per meter squared. The shaded hexagrids may inform the end user as to how soil strength in the field relates to yield. For example, the lighter areas in the plot 1200 may correspond to low yield areas. A user of the present techniques may analyze the plot 1200 for purposes of understanding, or explaining, a potential causal relationship between soil strength and growing conditions. For example, a trusted advisor may interpret the plot 1200 by noting the lighter-colored areas, and advising a grower that adding more fertilizer is not likely to make any difference in yield, given that the lighter-colored areas likely need tillage, tiling, etc. to alleviate conditions.

The present techniques may advantageously improve yields in precision agricultural systems that rely on digital infrastructure. For example, assuming a +/−six bushel/acre yield differential, as in FIG. 12C, one may assume corn costing $4/acre. In that case, the expected loss may be as much as $24/acre. For the not uncommon scenario of a grower responsible for many thousands of acres (e.g., 10,000 or more), losses of this order may be significant (i.e., resulting in losses of hundreds of thousands of dollars or more). The present techniques advantageously may prevent such losses by helping growers, field managers, agronomists or other interested parties understand the causal relationship between soil strength and yield. Those responsible for field planting and management may then alleviate such losses, leading to the use of fewer resources/improved efficiency on fields, and thereby enhancing the quality of the environment by not overusing fertilizer as well as using less energy and conserving resources (e.g., by performing prescriptive tiling or tillage rather than wide-scale interventions).

In some embodiments, the sustainability module may include instructions for executing an expert system or machine learning module to analyze one or more of the inferred soil strength, rate of soil change and/or aggregate stability to generate recommendations. For example, the one or more recommendations may be accompanied by an executable agricultural prescription that the interested party may load into an implement, for modifying the state of one or more field. The one or more recommendations may include a list of steps for the interested party to follow, such as an amount or schedule of fertilizer, a tillage operation, etc.

In some embodiments, inferred soil strength, rate of soil change and/or aggregate stability may be combined to quantify soil properties of a field and to enable an interested party sustainable field interventions. The present techniques may include an optimization module (not depicted) that uses any of the inferred soil strength, rate of soil change and/or aggregate stability to assess a sustainability with respect to an agricultural field. The optimization module may include a plurality of rule-based instructions for optimizing sustainability. The optimization module may not optimize purely for yield. Rather, in some embodiments, sustainability may be optimized using a rule that strikes a balance between maximizing yields and maintaining soil health for the current (and subsequent) growing seasons.

For example, the sustainability module may avoid maximizing soil health (e.g., by the addition of expensive product-based interventions) once the soil strength module 162 has determined that the field includes excessively-high soil strength values. Rather, the sustainability module may measure/quantify the high soil strength values to mitigate the high soil strength values, and to model the field to quantify the impact of management operations during the current growing season as compared to previous/subsequent growing seasons.

It should be appreciated in some embodiments, not all of the aggregate stability values, rate of soil change value and soil strength value may be used. For example, in an embodiment, only one of the values may be used. In another embodiment, only two of the three values may be used.

Exemplary Computer-Implemented Methods

Figure 13:
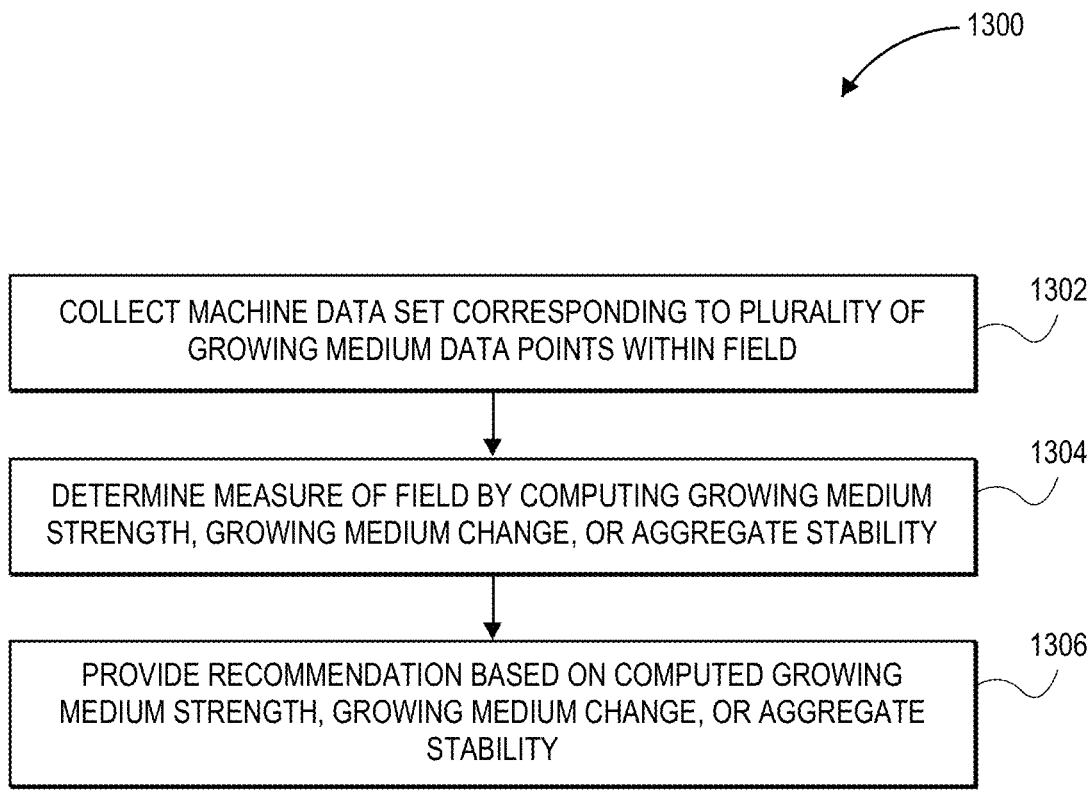
FIG. 13 depicts an exemplary computer-implemented method for modeling soil processes and properties by analyzing machine data and soil properties, according to one embodiment and scenario.

FIG. 13 depicts a flow diagram of an example computer-implemented method 1300 for improving a computer-implemented method of improving sustainable growing practices within an agricultural field, according to one embodiment and scenario.

The method 1300 may include collecting a machine data set corresponding to the field corresponding to a plurality of growing medium data points within the field (block 1302). In some embodiments, the machine data set includes data encoded as a plurality of hexagrids. For example, the machine data may be collected by the client computing device 102 of FIG. 1. The client computing device 102 may receive the machine data from one or more sensors, or from a third-party device (e.g., a Farmobile PUC). In some embodiments, the machine data may be transferred from the implement 104 of FIG. 1 to a cloud server via the network 108. In that case, the machine data may be later retrieved and processed by the remote computing device 106.

The remote computing device 106 may store received machine data (e.g., in the database 108), enabling analysis of the machine data by the one or more modules included in the memory 142 of FIG. 1. The modules may analyze the machine data and generate additional information (e.g., one or more map layers) as discussed herein. The modules in the memory 142 may also modify/decorate the machine data by, for example, encoding the machine data in a spatial data format. Some embodiments may include data cleaning and/or data processing techniques. For example, the method 1300 may include generating a plurality of line features by analyzing global positioning satellite data included in a plurality of observations in the machine data.

In some embodiments, aligning line features of machine data using GPS may include encoding the machine data using a hexagrid tiling scheme, as shown in FIG. 7. The method 1300 may include aligning the plurality of line features with the plurality of hexagrids; and assigning, based on the alignment, respective machine parameters from the machine data to each of the plurality of hexagrids. For example, an organic matter value of a given hexagrid may be assigned based on the line feature alignment.

The present techniques may include interpolating machine data values for hexagrids in between sample points. For example, with reference to FIG. 2, hexagrids corresponding to areas of the field between the data points 204 may have machine data values assigned by interpolating one or more of the data points 204. For example, the data collection module 150 may interpolate organic matter readings from two or more data points 204, and assign the interpolated value to hexagrids falling in between the two points.

In some embodiments, the machine data may include information describing an agricultural field obtained from core samples. The core samples may be obtained manually or automatically (e.g., via a hydraulic soil core sampler coupled to the implement 104). For example, the machine data may relate to two-inch core samples collected from the agricultural field. In embodiments, the machine data may include data describing basic soil properties of the agricultural field. Such soil properties may include, for example, organic matter, cation exchange capability, soil series, etc. Additional descriptive soil characteristics may be computed based on the basic soil properties, and machine data describing the agricultural field may be integrated with data from third-party sources (e.g., elevation data, Lidar data, etc.). Some soil properties in the machine data set (e.g., soil wetness index) may be derived from such third-party sources, whereas other soil properties (e.g., organic matter and cation exchange capability) are measured directly from core samples.

As discussed above, the present techniques include predicting soil properties using machine data, representing a significant improvement over conventional methods that require extensive manual labor and time. The prediction may be based on analyzing machine data collected during primary tillage operations, in some embodiments.

The present techniques may include generating many different map layer types. The map layers advantageously provide the end user with the ability to visualize data regarding one or more fields, spot trends and gain understanding not possible in conventional approaches. For example, the method 1300 may include generating an engine torque map layer including an indication of the respective draw bar load for at least one of the plurality of hexagrids, as shown in FIG. 8.

The method 1300 may include generating at least one of one or more relative elevation layers, one or more organic matter layers, one or more cation exchange capability layers, or one or more soil wetness index layers, as shown in FIG. 3, FIG. 4A, FIG. 4B and FIG. 4C. Such layers may include machine data from samples as well as computed machine data. In some embodiments, the method 1300 may include generating a plurality of bulk density map layers, each respective bulk density map layer corresponding to a distinct soil depth range, as shown in FIG. 5A, FIG. 5B and FIG. 6. Soil series information may be included in the bulk density visual maps.

The present techniques may be used to quantify the drawbar load of an implement (e.g., a tractor). Known properties of farming equipment may be used to compute drawbar load. The results of the drawbar analysis may include information regarding max torque in foot-pounds, max torque rise as a percentage, max drawbar pull in pounds, and torque at rated speed/RPM in foot-pounds. Such values may be represented graphically, as shown in FIG. 9. The present techniques may include relating torque to drawbar pull, and inferring additional information based on this inference. For example, the method 1300 may include determining a drawbar load of a growing implement according to the equation $$D = F_i * [A + B(S) + C(S^2)] * W * TD$$

wherein D is equal to the implement draft in foot-pounds; wherein F is equal to a soil texture adjustment parameter; wherein A, B and C are equal to parameters specific to the growing implement; wherein S is equal to field speed of the growing implement; wherein W is a machine width of the growing implement; and wherein TD is a tillage depth of the growing implement.

The quantification of drawbar load may be correlated to GPS locations within a field, and added to a map layer for visualization as shown in FIG. 10. Specifically, the method 1300 may include generating, by analyzing the determined drawbar load, one or more plots including one or more visual indications corresponding to causes of increased draft of the growing implement. The present techniques may include generating one or more factor loading visualizations (e.g., using a PLS algorithm or another suitable machine learning algorithm), as shown in FIG. 11A, FIG. 11B, FIG. 11C and FIG. 11D. These visualizations in particular enable end users to understand the drivers of increased draft, at or below a given threshold torque value.

The method 1300 may include determining a measure of the field by computing at least one of a growing medium strength of the field, a rate of growing medium change of the field, or an aggregate stability of the field (block 1304). Organic matter and kinetic energy information may be used to compute aggregate stability from machine data, at the hexagrid level. The rate of soil/growing medium change over time may be estimated using aggregate stability and cumulative rainfall to estimate kinetic energy as an input. The rate of change in energy may then be tracked. Soil strength may be measured, by analyzing the energy exerted against a farm implement (e.g., a ripper attachment 130 of the implement 104 in FIG. 1) as the implement traverses the field. Such strength may be compared over time, to determine the change in soil strength. The present techniques may include generating one or more map layers depicting the growing medium strength of the field, a rate of growing medium change of the field, or an aggregate stability of the field, as shown in FIG. 12A, FIG. 12B, FIG. 12C and FIG. 12D.

The method 1300 may include providing a recommendation based on the at least one of the growing medium strength of the field, the rate of growing medium change of the field, or the aggregate stability of the field (block 1306). In some embodiments, a machine learning model or rules-based expert system may be used to generate the recommendation, and to provide the recommendation to an end user in an electronic form.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed:

1. A computer-implemented method of improving and quantifying sustainable growing practices within an agricultural field, comprising:
    receiving, via one or more processors, a machine data set corresponding to a plurality of growing medium data points within the agricultural field;
    determining, via one or more processors, for each of a plurality of hexagrids corresponding to the agricultural field, a respective soil strength measurement;
    processing, via one or more processors, the respective soil strength measurement of at least one of the plurality of hexagrids using a trained machine learning model to generate a recommendation for improving soil stability including a computer-readable agricultural prescription executable by an agricultural implement to modify a state of the agricultural field by incorporating crop residues at a plurality of soil depths; and
    storing, via one or more processors, the executable agricultural prescription in a non-transitory memory.

2. The computer-implemented method of claim 1, wherein receiving, via the one or more processors, the machine data set corresponding to the plurality of growing medium data points within the agricultural field includes receiving the machine data from a cloud server via a computer network.

3. The computer-implemented method of claim 1, further comprising:
    decorating the machine data by encoding the machine data in a spatial data format.

4. The computer-implemented method of claim 1, wherein processing the respective soil strength measurement includes maximizing a yield function and/or minimizing a sustainability function.

5. The computer-implemented method of claim 1, further comprising:
    providing input into the machine learning model including a soil strength, a rate of soil change or an aggregate sustainability of at least one of the plurality of growing medium data points within the agricultural field.

6. The computer-implemented method of claim 1, further comprising:
    optimizing the executable agricultural prescription to balance maximum yield and soil health for sustainability of the agricultural field.

7. The computer-implemented method of claim 1, further comprising:
    generating, via one or more processors, one or more map layers based on the machine data set corresponding to the plurality of growing medium datapoints within the agricultural field.

8. A computing system comprising:
    one or more processors; and
    one or more memories having stored thereon instructions that, when executed by the one or more processors, cause the computing system to:
    receive, via the one or more processors, a machine data set corresponding to a plurality of growing medium data points within an agricultural field;
    determine, for each of a plurality of hexagrids corresponding to the agricultural field, a respective soil strength measurement;
    process the respective soil strength measurement of at least one of the plurality of hexagrids using a trained machine learning model to generate a recommendation for improving soil stability including a computer-readable agricultural prescription executable by an agricultural implement to modify a state of the agricultural field by incorporating crop residues at a plurality of soil depths; and
    store the executable agricultural prescription in the one or more memories.

9. The computing system of claim 8, the one or more memories having stored thereon further instructions that when executed, cause the computing system to:
    receive the machine data from a cloud server via a computer network.

10. The computing system of claim 8, the one or more memories having stored thereon further instructions that when executed, cause the computing system to:
    decorate the machine data by encoding the machine data in a spatial data format.

11. The computing system of claim 8, the one or more memories having stored thereon further instructions that when executed, cause the computing system to:
    maximize a yield function and/or minimize a sustainability function.

12. The computing system of claim 8, the one or more memories having stored thereon further instructions that when executed, cause the computing system to:
    provide input into the machine learning model including a soil strength, a rate of soil change or an aggregate sustainability of at least one of the plurality of growing medium data points within the agricultural field.

13. The computing system of claim 8, the one or more memories having stored thereon further instructions that when executed, cause the computing system to:
    generate an electronic report.

14. The computing system of claim 8, the one or more memories having stored thereon further instructions that when executed, cause the computing system to:
    optimize the executable agricultural prescription to balance maximum yield and soil health for sustainability of the agricultural field.

15. A non-transitory computer readable medium containing program instructions that when executed, cause a computer to:
    receive, via one or more processors, a machine data set corresponding to a plurality of growing medium data points within an agricultural field;

determine, for each of a plurality of hexagrids corresponding to the agricultural field, a respective soil strength measurement;

process the respective soil strength measurement of at least one of the plurality of hexagrids using a trained machine learning model to generate a recommendation for improving soil stability including a computer-readable agricultural prescription executable by an agricultural implement to modify a state of the agricultural field by incorporating crop residues at a plurality of soil depths; and store the executable agricultural prescription in the computer readable medium.

16. The non-transitory computer readable medium of claim 15, containing further program instructions that when executed, cause a computer to:

receive the machine data from a cloud server via a computer network.

17. The non-transitory computer readable medium of claim 15, containing further program instructions that when executed, cause a computer to:

decorate the machine data by encoding the machine data in a spatial data format.

18. The non-transitory computer readable medium of claim 15, containing further program instructions that when executed, cause a computer to:

maximize a yield function and/or minimize a sustainability function.

19. The non-transitory computer readable medium of claim 15, containing further program instructions that when executed, cause a computer to:

provide input into the machine learning model including a soil strength, a rate of soil change or an aggregate sustainability of at least one of the plurality of growing medium data points within the agricultural field.

20. The non-transitory computer readable medium of claim 15, containing further program instructions that when executed, cause a computer to:

optimize the executable agricultural prescription to balance maximum yield and soil health for sustainability of the agricultural field.

* * * * *